(12) United States Patent
     Cheesman

(10) Patent No.: US 10,949,399 B2
(45) Date of Patent: Mar. 16, 2021

(54) DYNAMICALLY SYNCHRONIZING ELECTRONIC SURVEYS AND COLLABORATIVE SURVEY REPRESENTATION DOCUMENTS

(71) Applicant: Qualtrics, LLC, Provo, UT (US)

(72) Inventor: Larry Dean Cheesman, Provo, UT (US)

(73) Assignee: QUALTRICS, LLC, Provo, UT (US)

( * ) Notice: Subject to any disclaimer, the term of this patent is extended or adjusted under 35 U.S.C. 154(b) by 311 days.

(21) Appl. No.: 15/954,285

(22) Filed: Apr. 16, 2018

(65) Prior Publication Data

US 2019/0318015 A1     Oct. 17, 2019

(51) Int. Cl.
*G06F 16/178* (2019.01)
*G06F 16/176* (2019.01)
*G06F 40/106* (2020.01)
*G06F 40/177* (2020.01)

(52) U.S. Cl.
CPC .......... *G06F 16/178* (2019.01); *G06F 16/176* (2019.01); *G06F 40/106* (2020.01); *G06F 40/177* (2020.01)

(58) Field of Classification Search
USPC .................................................. 707/608, 756
See application file for complete search history.

(56) References Cited

U.S. PATENT DOCUMENTS

| | | | | |
|---|---|---|---|---|
| 8,429,179 B1* | 4/2013 | Mirhaji | ............... | G06F 16/3344 707/756 |
| 2004/0143630 A1* | 7/2004 | Kaufmann | ............... | G09B 7/02 709/205 |
| 2004/0210820 A1* | 10/2004 | Tarr | .................... | G06Q 30/0203 715/230 |
| 2004/0249650 A1* | 12/2004 | Freedman | .............. | G06Q 30/02 705/7.29 |
| 2013/0325627 A1* | 12/2013 | Kimmerling | ........... | G06F 16/24 705/14.66 |
| 2015/0006473 A1* | 1/2015 | Kritt | ....................... | G06F 40/30 707/608 |
| 2017/0032395 A1* | 2/2017 | Kaufman | .............. | G06F 3/0482 |

* cited by examiner

*Primary Examiner* — Cam Linh T Nguyen
(74) *Attorney, Agent, or Firm* — Keller Jolley Preece

(57) ABSTRACT

The present disclosure is directed toward systems and methods for dynamically generating a single survey representation document that includes the disparate components of an electronic survey maintained across one or more repositories by an electronic survey system. Furthermore, the systems and methods described herein provide the survey representation document for collaboration to one or more author computing devices, and synchronize any edits made to the survey representation document with the original electronic survey.

20 Claims, 10 Drawing Sheets

DYNAMICALLY SYNCHRONIZING ELECTRONIC SURVEYS AND COLLABORATIVE SURVEY REPRESENTATION DOCUMENTS

BACKGROUND

Electronic surveys are useful for requesting and collecting detailed information related to products and services. Specifically, the collected information can enable entities related to the products and/or services to improve their offerings. For instance, medical providers, government entities, retail providers, and other service providers often utilize electronic surveys to collect information from patients, citizens, and customers to personalize a service to an individual, to comply with governmental regulations, or to improve a product.

Conventional survey systems have a number of shortcomings with regard to the process by which an electronic survey is created. For example, electronic surveys are often created by several authors who collaborate on the text of questions and response options. Additionally, authors will often collaborate on the flow of the survey in terms of question order and branching. Conventional electronic survey systems, however, are inflexible and inefficient when used in a collaborative context.

For instance, conventional survey systems generally allow for only one author at a time to edit an electronic survey. For example, in order for multiple authors to collaborate on a single electronic survey, a conventional survey system typically requires each author to log in and access the electronic survey one at a time. Accordingly, conventional survey systems exhaust system resources by requiring multiple user logins to enable more than one user to collaborate on a single electronic survey.

Additionally, conventional survey systems inefficiently utilize storage resources when multiple authors collaborate on a single electronic survey. For example, when more than one author edits a single electronic survey in a convention survey system, the survey system typically stores multiple versions of the electronic survey in order to avoid conflicts and edit overwrites among the multiple authors. This leads to wasted storage resources, and to inevitable conflicts when combining the multiple edited versions into a single electronic survey.

Accordingly, these and other disadvantages exist with respect to conventional survey systems.

SUMMARY

Embodiments of the present disclosure provide benefits and/or solve one or more of the foregoing or other problems in the art with systems, methods, and non-transitory computer-readable media for dynamically enabling collaboration on a single electronic survey among multiple survey authors. Specifically, in some embodiments, the systems and methods map an existing electronic survey to a survey representation document that can easily and intuitively be utilized in a collaborative context by multiple survey authors. For example, while a single electronic survey includes contents and flow logic that are maintained across multiple linked data repositories, the systems and methods described herein map the various disparate components of the electronic survey into a representative document that multiple authors can access to allow for collaboration when creating and editing an electronic survey. Furthermore, systems and methods described herein can make the survey representation document available via other collaboration systems outside the electronic survey system such that authors can collaborate on the representation document even if they do not have access to the electronic survey system.

Additionally, in one or more embodiments, the systems and methods described herein receive and synchronize the contents of an edited survey representation document with an existing electronic survey. For example, the systems and methods described herein can receive an edited survey representation document from a collaboration system outside the electronic survey system that corresponds to an existing electronic survey. Furthermore, the systems and methods described herein can efficiently analyze the contents of the edited survey document to determine one or more updates to the electronic survey, and can map those updates back into the various disparate components of the existing electronic survey. Accordingly, the systems and methods described herein avoid the inefficiencies and pitfalls of conventional survey systems with a flexible solution for collaboration.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These, and other features, will become more fully apparent from the following description and appended claims, or can be learned by the practice of such exemplary embodiments as set forth hereinafter.

BRIEF DESCRIPTION OF THE DRAWINGS

Various embodiments will be described and explained with additional specificity and detail through the use of the accompanying drawings, in which.

DETAILED DESCRIPTION

Figure 1:
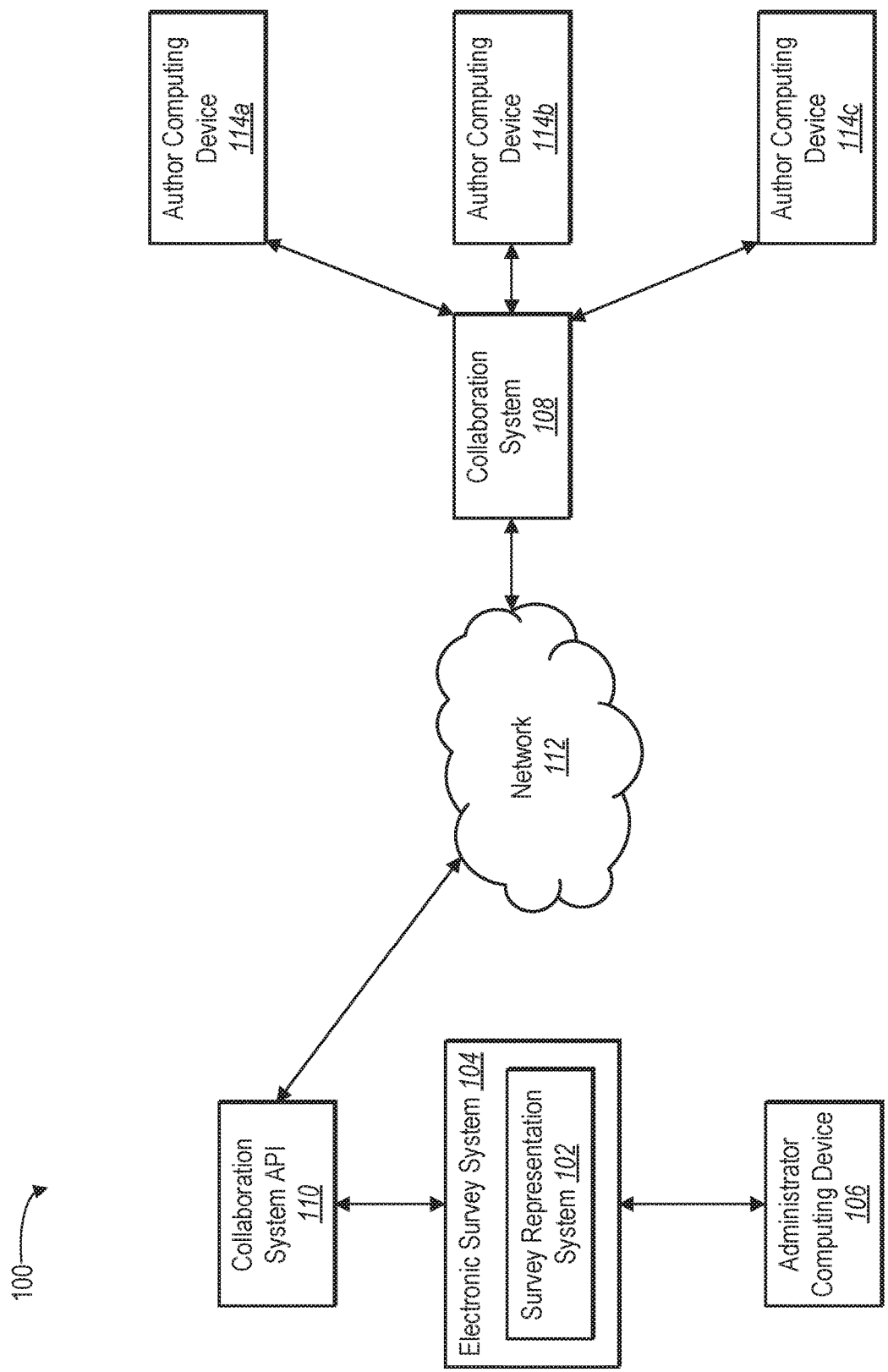
FIG. 1 illustrates a block diagram of a digital communication environment in which a survey representation system operates in accordance with one or more embodiments.

One or more embodiments disclosed herein provide a survey representation system that dynamically generates a survey representation document by mapping various components of an electronic survey to segments of the survey representation document. In one or more embodiments, the survey representation system is hosted by an electronic survey system and accesses various repositories associated with an electronic survey in order to map the disparate components of the electronic survey to a single survey representation document. For example, the survey representation system accesses various repositories within the electronic survey system that store components of an electronic survey in order to generate a single survey representation document that is easily and intuitively edited by multiple survey authors.

Additionally, the survey representation system receives triggers associated with the generated survey representation document, and determines whether to synchronize the survey representation document and generate an updated electronic survey based on the received triggers (e.g., update one or more components of the electronic survey within the electronic survey system). For example, in at least one embodiment, the survey representation system provides the generated survey representation document to one or more authors for collaboration via a collaboration system outside the electronic survey system. The survey representation system can synchronize the survey representation document with corresponding components within an electronic survey in the electronic survey system in response to receiving one or more triggers that indicate the survey representation document has been edited by one or more authors.

Accordingly, the survey representation system provides a flexible and efficient computer-based solution that addresses many shortcomings that exist in conventional survey systems. For example, the survey representation system flexibly enables multiple authors to collaborate on a single electronic survey without overburdening system resources. The survey representation system also efficiently leverages existing collaboration systems to provide a survey representation document to multiple authors even when some or all of the authors are not electronic survey system users.

To illustrate the features and functionality of the survey representation system, an example embodiment of the survey representation system includes an electronic survey maintained by the electronic survey system across multiple repositories. For example, in one or more embodiments, the electronic survey system stores components of an electronic survey in multiple storage repositories where the electronic survey components are linked together by one or more keys. For instance, in one embodiment, the electronic survey system stores an electronic survey identifier associated with the electronic survey along with question identifiers for each question in the electronic survey in one repository. The electronic survey system then stores the contents of each question in the electronic survey in another repository linked to the first repository by question identifiers associated with each question. For example, a question can include question text (e.g., a question prompt, a question string), as well as response text associated with one or more possible responses to the question text, and the question type (e.g., multiple choice question, free-form question). The electronic survey system also stores survey flow logic in another repository linked to the first repository by the electronic survey identifier. Accordingly, in order to support fast and efficient storage and retrieval of electronic survey components, the electronic survey system stores the components of an electronic survey across multiple disparate repositories.

To enable multiple authors to simultaneously access and edit the electronic survey, the survey representation system generates a single survey representation document that includes the various components (e.g., question contents, IDs, flow logic) of the electronic survey stored across multiple repositories in the electronic survey system. For example, in one or more embodiments, the survey representation system generates the survey representation document in one of various formats (e.g., a spreadsheet, text document, table, chart, or other electronic document) by extracting the components of the electronic survey from one or more repositories and configuring those components into a survey representation document.

For instance, in one embodiment, the survey representation system generates a survey representation document associated with an electronic survey by first identifying all the question identifiers associated with the electronic survey. The survey representation system then extracts the question contents (e.g., question text strings, response text strings, digital images) associated with a first question identifier, as well as any response contents associated with the first question identifier. The survey representation system then configures the question and response contents as a document segment in the survey representation document, and repeats these steps for each question identifier associated with the electronic survey. For example, a document segment of the survey representation document can include one or more table cells, a row of a table, a block of text, or a portion of an outline, depending on the format of the survey representation document.

In one or more embodiments, an electronic survey is associated with survey flow logic that dictates the question order and/or branching associated with the questions in the electronic survey. For example, the electronic survey system may present the questions of the electronic survey to a survey respondent in an order where the next question presented depends on the selected response to a previous question. Thus, the questions presented to one respondent may differ from the questions presented to another respondent, even though both respondents take the same electronic survey.

In at least one embodiment, the survey representation system can represent survey flow logic in a generated survey representation document by adding one or more flow logic indicators to the response contents in the survey representation document. For example, in one or more embodiments, a flow logic indicator can be a textual string, a color, pseudocode, a numerical code, or a display structure. To illustrate, in one example the survey flow logic associated with an electronic survey dictates that, in response to a selection of a first response to a first question in the electronic survey, the next question presented to the respondent should be the third question in the electronic survey (e.g., skipping the second question). Accordingly, in order to represent this survey flow logic in a generated survey representation document associated with the electronic survey, the survey representation system can add a flow logic indicator to the contents of the first response to the first question that indicates the next following question is the third question.

In one or more embodiments, the survey representation system can include additional header/footer information in the generated survey representation document. For example, the survey representation system can extract an electronic survey title and identifier from the one or more repositories maintained by the electronic survey system. Additionally, the survey representation system can include a survey preview button or link in the header/footer that enables an author to view a preview of the electronic survey associated with a generated survey representation document.

In order to enable multiple authors to collaborate on the same electronic survey, the survey representation system can provide the generated survey representation document to a collaboration system. For example, in one embodiment, the survey representation system utilizes an application program interface (e.g., an "API") associated with one or more collaboration systems in order to provide the generated survey representation document for display and interaction to one or more authors. The one or more collaboration systems can then provide the generated survey representation document to the one or more authors.

In at least one embodiment, the survey representation system utilizes the collaboration system API to receive updates related to the survey representation document from the collaboration system. For example, the collaboration system can send an update to the survey representation system via the API each time an author accesses the survey representation document, each time an author modifies the survey representation document, each time an author previews the survey representation document, and/or each time an author closes or saves the survey representation document.

In response to receiving any of these updates, the survey representation system can determine whether to synchronize the survey representation document with the electronic survey stored across multiple repositories within the electronic survey system. For example, in response to determining that the survey representation document has not been modified for a threshold amount of time (e.g., ninety seconds), the survey representation system can request a copy of the survey representation document from the collaboration system via the API. The survey representation system can then synchronize the electronic survey with the survey representation document by identifying and reconciling differences between the survey representation document and components of the electronic survey stored in one or more repositories within the electronic survey system.

FIG. 1 illustrates an environment 100 in which an exemplary survey representation system 102 may be implemented in accordance with one or more embodiments. As shown, the environment 100 includes the survey representation system 102 hosted on an electronic survey system 104, as well as a collaboration system API 110, and the collaboration system 108. Moreover, as illustrated, the environment 100 also includes an administrator computing device 106, as well as an author computing device 114a, an author computing device 114b, and an author computing device 114c.

In one or more embodiments, the survey representation system 102, the administrator computing device 106, the collaboration system API 110, the collaboration system 108, and the author computing devices 114a-114c communicate via the network 112, which may include one or more networks and may use one or more communication platforms or technologies suitable for transmitting data and/or communication signals. In one or more embodiments, the network 112 includes the Internet or World Wide Web. The network 112, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks. Additional details relating to the network 112 are explained below with reference to FIG. 10.

As shown in FIG. 1, the environment 100 includes the electronic survey system 104. In one or more embodiments, the electronic survey system 104 includes various interfaces and storage repositories that enable an administrator to create and publish an electronic survey. In at least one embodiment, the electronic survey system 104 is implemented by one or more servers, which may generate, store, receive, and transmit any type of data. For example, the one or more servers may transmit data to the administrator computing device 106 and/or the collaboration system 108 (e.g., via the collaboration system API 110). In one example embodiment, the electronic survey system 104 is implemented on one or more content servers. In additional or alternative embodiments, the electronic survey system 104 can also be implemented on one or more web-hosting servers.

Moreover, in one or more embodiments, the electronic survey system 104 includes or hosts the survey representation system 102. In one or more embodiments, the survey representation system 102 accesses the electronic survey system 104 to map the contents of one or more storage repositories related to a particular electronic survey to a single survey representation document. In at least one embodiment, the survey representation system 102 provides the generated survey representation document to the collaboration system 108, via the collaboration system API 110.

In at least one embodiment, the collaboration system API 110 is an application program interface that includes a set of routines, protocols, and tools that enable the survey representation system 102 to provide data to and receive data from the collaboration system 108. For example, the survey representation system 102 can utilize routines, protocols, and tools provided by the collaboration system API 110 to provide a generated survey representation document to the collaboration system 108. Similarly, utilizing routines, protocols, and tools provided by the collaboration system API 110, the survey representation system 102 can receive one or more indications of modifications (e.g., author edits) related to the survey representation document and can request a copy of the edited survey representation document from the collaboration system 108.

In one or more embodiments, the collaboration system 108 is a cloud-based system that provides electronic documents (e.g., electronic word processing documents, electronic spreadsheet documents, electronic presentation slide documents) to users for collaboration. For example, in at least one embodiment, the collaboration system 108 creates instances or copies of a single electronic document for display at each author computing device 114a-114c. The collaboration system 108 can then receive indications of modifications from the author computing devices 114a-114c to each instance of the electronic document, and can reconcile the various modifications into a single instance of the electronic document. Alternatively, the collaboration system 108 may utilize a locking scheme that provides the electronic document for editing to one author computing device at a time.

In one or more embodiments, the administrator computing device 106, and the author computing devices 114a-114c can be one of various types of computing devices. For example, the administrator computing device 106, and the author computing devices 114a-114c may include a mobile device such as a mobile telephone, a smartphone, a PDA, a tablet, or a laptop. Additionally, or alternatively, the administrator computing device 106, and the author computing devices 114a-114c may include a non-mobile device such as a desktop computing, a server, or another type of computing device. In at least one embodiment, the administrator computing device 106 accesses the electronic survey system 104 via a web browser or a native electronic survey system application installed thereon. Similarly, in at least one embodiment, the author computing devices 114a-114c access the collaboration system 108 via a web browser or native collaboration system application installed thereon.

Although FIG. 1 illustrates a particular number and arrangement of the administrator computing device 106, the electronic survey system 104, the survey representation system 102, the collaboration system API 110, the collaboration system 108, and the author computing devices 114a-114c, additional numbers and arrangements are possible. For example, in an alternative embodiment, the survey representation system 102 may communicate directly with the collaboration system 108 via the collaboration system API 110, rather than through the network 112. In another alternative embodiment, the survey representation system 102 may communicate directly with the collaboration system 108, foregoing the collaboration system API 110. In yet another alternative embodiment, any number of administrator computing devices may utilize the electronic survey system 104, while any number of author computing devices may utilize the collaboration system 108. Moreover, in at least one embodiment, any of the author computing devices 114a-114c can access the electronic survey system 104, while the administrator computing device 106 can access the collaboration system 108.

Figure 2:
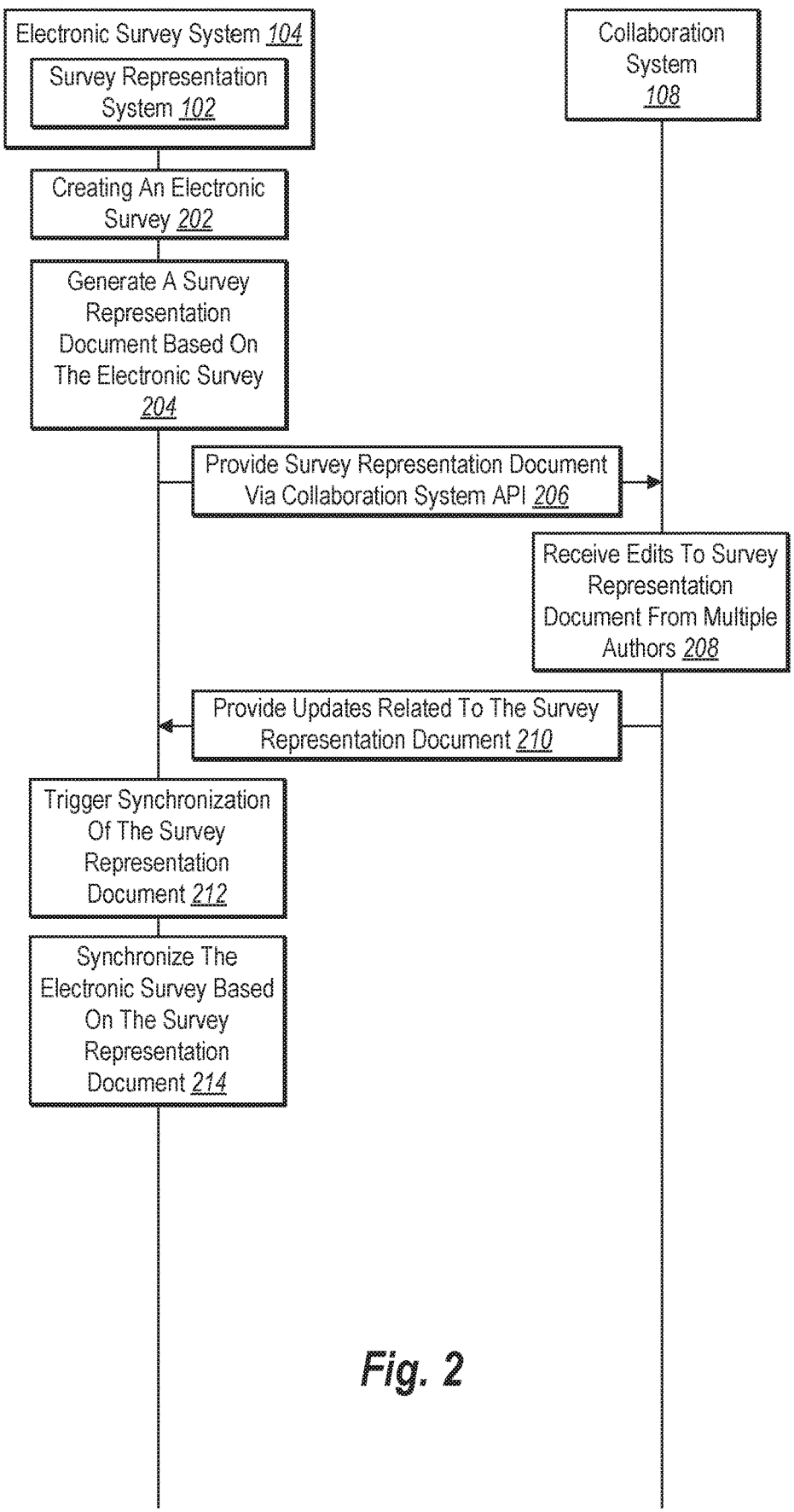
FIG. 2 illustrates a sequence-flow diagram for generating and synchronizing a survey representation document based on an electronic survey in accordance with one or more embodiments.

FIG. 2 illustrates a sequence of acts undertaken by the survey representation system 102 to generate and utilize a survey representation document. For example, as shown in FIG. 2, the electronic survey system 104 begins by creating an electronic survey (202). In one or more embodiments, the electronic survey system 104 creates an electronic survey by receiving data from an administrator computing device 106, and organizing that data into one or more linked repositories. To illustrate, the electronic survey system 104 can receive data from the administrator computing device 106 including, but not limited to, text associated with one or more questions, text associated with possible responses for each of the one or more questions, survey flow logic indicating question order and branching, and display characteristics dictating how one or more questions should be displayed on various types of respondent devices. The administrator computing device 106 can provide this data via one or more interfaces associated with the electronic survey system 104. In one or more embodiments, the electronic survey system 104 organizes this data into one or more repositories by assigning various identifiers to the survey, the questions, and responses, such that the components of a single electronic survey are linked across one or more repositories.

In response to the creation of the electronic survey, the survey representation system 102 generates a survey representation document based on the electronic survey (204). For example, in one or more embodiments, the survey representation system 102 generates the survey representation document by mapping components of the electronic survey linked across one or more repositories in the electronic survey system 104 to various document segments of a survey representation document. Accordingly, once generated, the survey representation document includes the contents and flow logic associated with the electronic survey in a single, intuitive electronic document.

Alternatively, the survey representation system 102 can generate the survey representation document (204) in response to receiving a request from the administrator computing device 106 to share or export the electronic survey. For example, the survey representation system 102 may detect a selection of an icon or display control associated with the electronic survey in a graphical user interface presented by the electronic survey system 104 (e.g., a selection of a menu item, a button, a link). In response to receiving this indication of an electronic survey identifier associated with the requested electronic survey, the survey representation system 102 can generate the survey representation document for that electronic survey.

To further illustrate, the survey representation system 102 can generate a survey representation document (204) based on an electronic survey with three questions, each question associated with three responses. In this example, the electronic survey includes only basic flow logic that dictates a flow order including the first question, followed by the second question, followed by the third question, regardless of the response choice associated with any question. Accordingly, the survey representation system 102 can generate the survey representation document based on this electronic survey by mapping each question and its associated responses to one or more segments of the survey representation document and linking the mapped segments to the original electronic survey question based on the question IDs. For example, the survey representation system 102 can map the question text and question ID associated with the first question to a first table cell in a row of the survey representation document, while mapping the response text associated with the first response to a second table cell in the row, mapping the response text associated with the second response to a third table cell in the row, and mapping the response text associated with the third response to a fourth table cell in the row.

Additionally, the survey representation system 102 can also add an indication of survey flow logic to one or more mapped segment of the survey representation document. For instance, in the example above, the survey representation system 102 can add a flow logic indicator to the text of the first response in the second table cell that indicates the next question following a selection of the first response is the second question in the electronic survey. Similarly, the survey representation system 102 can add the same flow logic indicator to the text of the second and third responses in the same row because, as stated above, the electronic survey has a basic flow logic where the questions are presented in order regardless of the response selection. In other embodiments, the survey representation system 102 can utilize flow logic indicators to represent more complicated survey flow logic in a survey representation document.

After generating the survey representation document based on the electronic survey (204), the survey representation system 102 can provide the survey representation document (206) via the collaboration system API 110 to the collaboration system 108. As mentioned above, in one or more embodiments, the collaboration system 108 is a cloud-based document system that enables multiple author computing devices 114a-114c to collaborate on a single document. For example, in at least one embodiment, the collaboration system 108 receives edits (e.g., indications of modifications) to the survey representation document from multiple authors (208) via a web-based interface (e.g., a web page) that enables the multiple authors to perform any number of modifications including, but not limited to, adding and deleting text, changing colors, altering table cells, adding digital images, updating font choices and sizes, and adding annotations.

In at least one embodiment, the collaboration system 108 utilizes the collaboration system API 110 to provide updates related to the survey representation document (210) to the survey representation system 102. The collaboration system 108 can provide updates related to the survey representation document (210) in response to various types of author activity. For example, the collaboration system 108 can provide updates every ten seconds while one or more author computing devices 114a-114c are accessing the survey representation document. Alternatively, the collaboration system 108 can provide updates after every keystroke, or after a threshold number of keystrokes or interactions (e.g., after every ten keystrokes, after every mouse click). Additionally or alternatively, the collaboration system 108 can provide updates in response to receiving an open command related to the survey representation document, a save command related to the survey representation document, or a close command related to the survey representation document from one or more of the author computing devices 114a-114c.

In one or more embodiments, an update provided by the collaboration system 108 can include various types and combinations of data. For example, in at least one embodiment, the collaboration system 108 provides an update that indicates the type of modification (e.g., text change, table cell deleted), that one or more of the author computing devices 114a-114c has made in connection with the survey representation document. Additionally, the update can also include information identifying the user associated with the author computing device than enacted the modification, as well as a timestamp indicating when the modification occurred.

In response to receiving one or more updates from the collaboration system 108 with regard to the survey representation document, the survey representation system 102 triggers the synchronization of the survey representation document (212). For example, the survey representation system 102 can trigger the synchronization of the survey representation document in response to every update received from the collaboration system 108. Alternatively, the survey representation system 102 can trigger the synchronization of the survey representation document in response to determining that no update has been received from the collaboration system 108 for a threshold amount of time. Alternatively, the survey representation system 102 can trigger the synchronization of the survey representation document in response to determining that one or more received updates indicate a combination of author actions have taken place (e.g., an modification and a save within a three minute time window).

The survey representation system 102 synchronizes the electronic survey based on the survey representation document (214) by identifying components of an electronic survey that correspond or link to segments of the survey representation document, and reconciling any differences between the two. For example, in at least one embodiment, the survey representation document includes an electronic survey identifier, as well as question identifiers, question text, response text, and one or more indications of survey flow. Accordingly, based on the electronic survey identifier in the survey representation document, the survey representation system 102 can identify data associated with an electronic survey associated with the same electronic survey identifier linked across one or more repositories in the electronic survey system 104.

In one or more embodiments, the survey representation system 102 matches segments of the survey representation document to the components of the electronic survey identified from the one or more repositories, and determines whether differences exist between each matched segment of the survey representation document and component of the electronic survey. If a difference exists, the survey representation system 102 reconciles the difference by determining if changing the component of the electronic survey to reflect the segment of the survey representation document will cause one or more errors in the electronic survey. For example, the survey representation system 102 can determine whether a change to a flow logic indicator associated with a particular response causes a loop, or cuts off a question branch within the electronic survey.

If the survey representation system 102 determines that changing a component of the electronic survey to reflect the segment of the survey representation document will cause one or more errors in the electronic survey, the survey representation system 102 can flag the difference (e.g., by highlighting text, including an error message) in the segment of the survey representation document for later review by an author or administrator. Alternatively, the survey representation system 102 can enter the change and send a message to the administrator computing device 106 detailing the error. If the survey representation system 102 determines that changing the component of the electronic survey to reflect the segment of the survey representation document will not cause one or more errors in the electronic survey, the survey representation system 102 can enact the change. Accordingly, the survey representation system 102 maps the modified survey representation document back into the corresponding electronic survey across one or more repositories within the electronic survey system 104.

Figure 3:
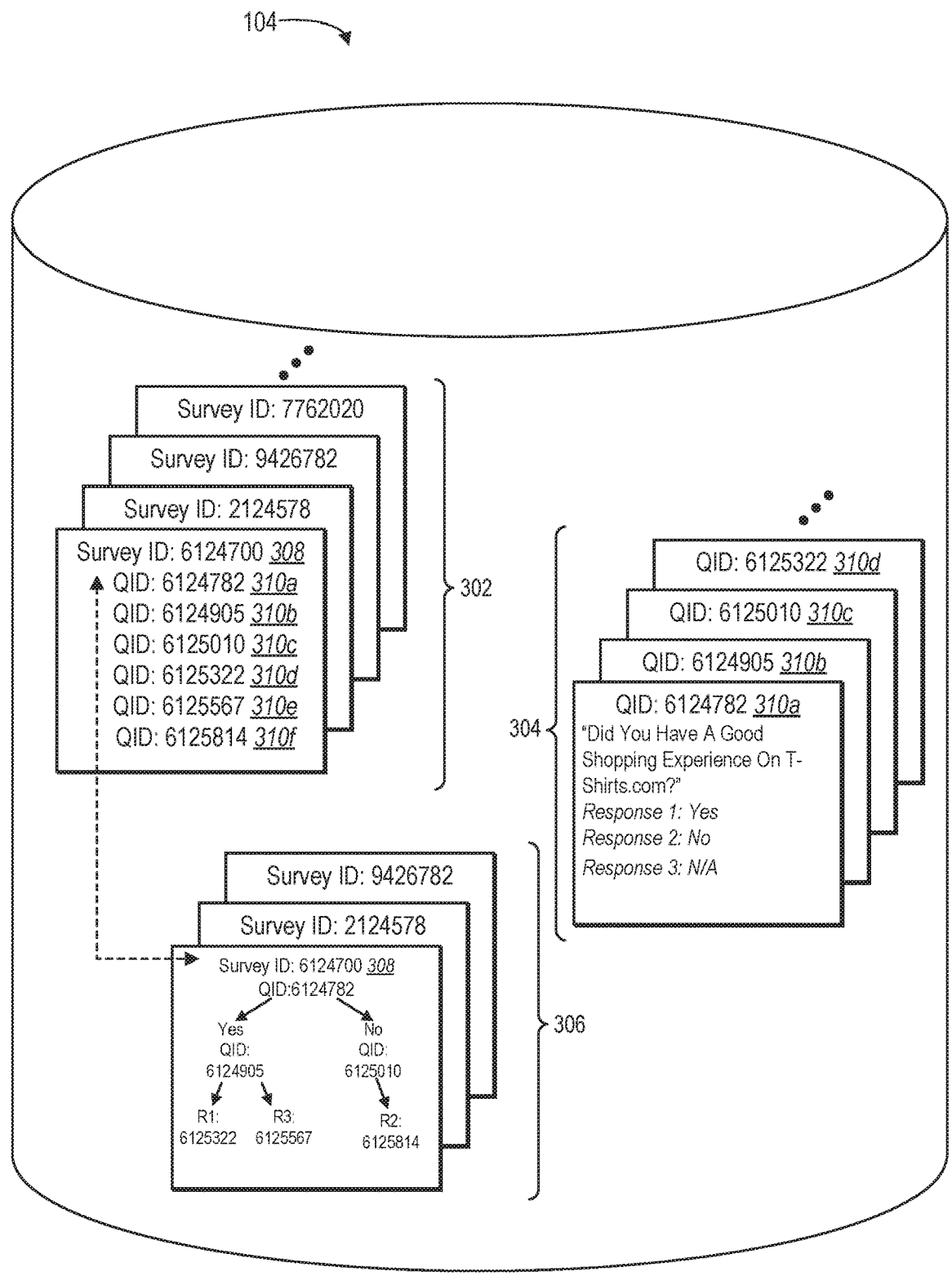
FIG. 3 illustrates a schematic diagram of a single electronic survey stored across multiple repositories within an electronic survey system in accordance with one or more embodiments.

As discussed above, in one or more embodiments, the electronic survey system 104 stores the components of a single electronic survey across multiple repositories in a linked repository scheme that enables quick data retrieval, balanced data loads, and easy survey editing. To illustrate an example embodiment of storage format utilized by the electronic survey system 104, FIG. 3 includes the components of an electronic survey stored across a question ID repository 302, a question contents repository 304, and a survey flow logic repository 306. As shown in FIG. 3, the question ID repository 302 includes multiple entries, each associated with an electronic survey ID. For example, in the embodiment illustrated in FIG. 3, the first entry in the question ID repository 302 is associated with the electronic survey identifier 308 (e.g., "Survey ID: 6124700"). Also shown in FIG. 3, the entry associated with the electronic survey identifier 308 also includes multiple question identifiers (e.g., the question identifiers 310a-310f) associated with the electronic survey identifier 308.

Moreover, as shown in FIG. 3, each question identifier 310a-310f is associated with an entry in the question contents repository 304. For example, each entry in the question contents repository 304 includes the content (e.g., textual characters arranged into text strings, digital images, other digital media) associated with an electronic survey question and its associated responses. As illustrated in FIG. 3, the first entry in the question contents repository 304 is associated with the question identifier 310a. Under the question identifier 310a in the question contents repository 304, the first entry includes question text (e.g., "Did you have a good shopping experience on tshirts.com?"). Additionally, the first entry also includes the text included in responses associated with the question identifier 310a (e.g., "Yes," "No," "N/A"). In an alternative embodiment, the electronic survey system 104 can include an additional repository with entries dedicated to each of the responses associated with a particular question identifier. In that embodiment, the entry in the question contents repository 304 can include response identifiers associated with a particular question identifier that cross-reference to the response repository.

In addition to the textual contents of questions and responses associated with an electronic survey, the electronic survey system 104 also stores survey flow logic associated with the electronic survey. For example, in one or more embodiments, an electronic survey can include basic flow logic that dictates the electronic survey system 104 presents questions associated with the electronic survey in order, one after the next. Alternatively, an electronic survey can include complex flow logic that dictates the electronic survey system 104 presents questions based on previous responses, user demographics, and other information. Accordingly, the electronic survey system 104 includes the survey flow logic repository 306, where each entry is associated with an electronic survey identifier.

For example, as shown in FIG. 3, the first entry in the survey flow logic repository 306 is associated with the electronic survey identifier 308 (e.g., "Survey ID: 6124700"), which the electronic survey system 104 links to an entry in the question ID repository 302. As further illustrated in FIG. 3, the first entry in the survey flow logic repository 306 includes information indicating the survey flow logic associated with the electronic survey represented by the electronic survey identifier 308. In one or more embodiments, the electronic survey system 104 represents the survey flow logic in various ways (e.g., graphical branching patterns, pseudocode). Regardless of the representation of the survey flow logic, the electronic survey system 104 formats the information within each entry in the survey flow logic repository 306 to indicate each possible flow path through an associated electronic survey.

Figure 4:
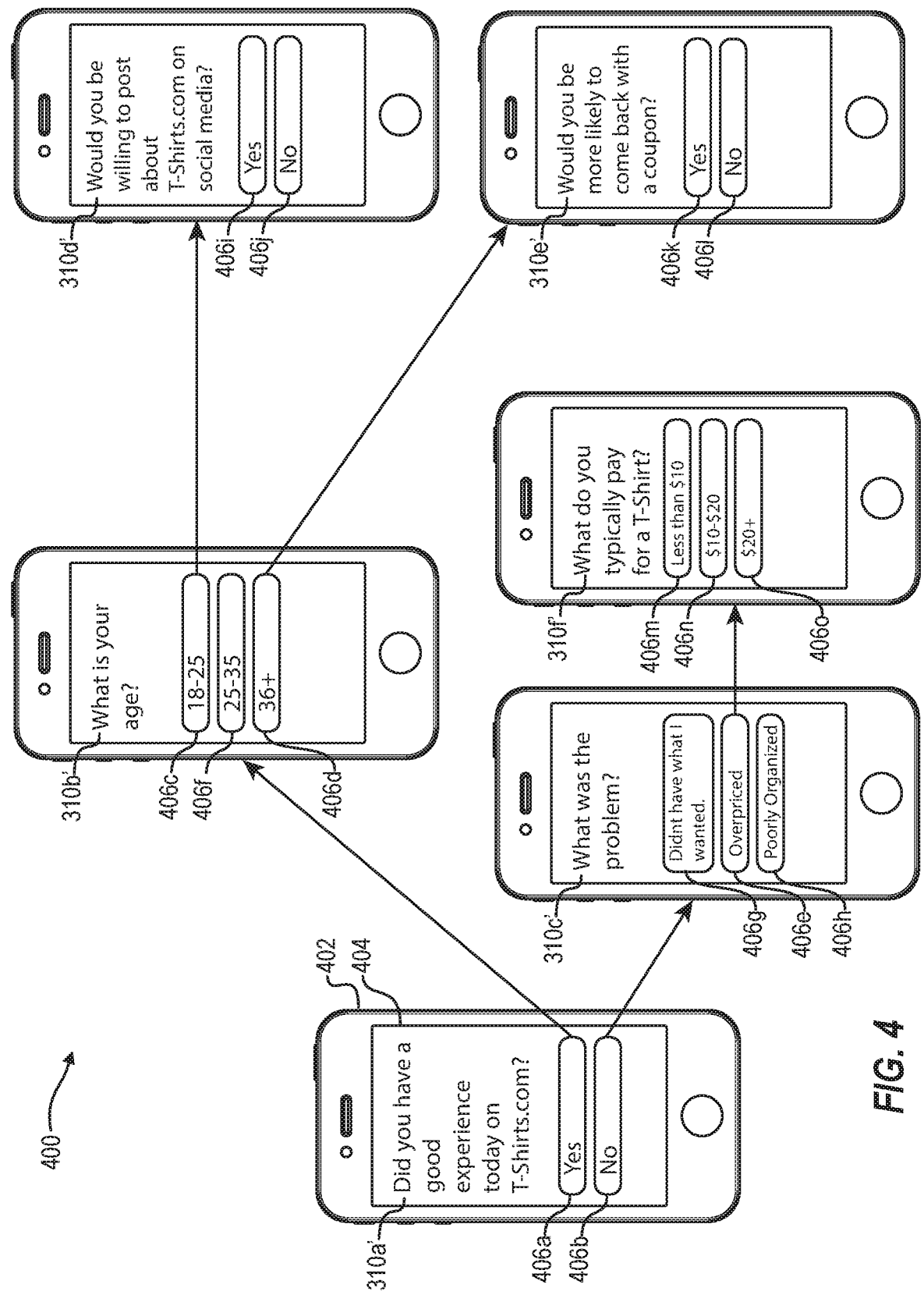
FIG. 4 illustrates survey flow logic within an electronic survey in accordance with one or more embodiments.

To further illustrate the features of the electronic survey system 104, FIG. 4 illustrates an example electronic survey 400. For example, the electronic survey 400 includes multiple components that the electronic survey system 104 stores across multiple repositories (e.g., the question ID repository 302, the question contents repository 304, and the survey flow logic repository 306), as shown in FIG. 3. In one or more embodiments, the information in the flow logic repository 306 dictates the order in which the electronic survey system 104 presents one or more questions to a user.

For example, as shown in FIG. 4, the electronic survey system 104 presents the text 310a' associated with the question identifier 310a on the touch screen display 404 of a user computing device 402 along with various response options (e.g., the response options 406a and 406b). In one or more embodiments, the electronic survey system 104 presents this information on the touch screen display 404 of the user computing device 402 in response to detecting a selection of a graphical display element associated with a particular electronic survey identifier (e.g., the electronic survey identifier 308 illustrated in FIG. 3).

In one or more embodiments, the electronic survey system 104 provides each response option as a selectable display element. In response to detecting a user interaction with a particular response option, the electronic survey system 104 provides another question on the touch screen display 404 of the user computing device 402, as dictated by the survey flow logic associated with the electronic survey (e.g., the electronic survey associated with the electronic survey identifier 308 illustrated in FIG. 3). For example, in response to detecting a user interaction with the response option 406a, the electronic survey system 104 provides the electronic survey question text 310b' associated with the question identifier 310b, as dictated by the survey flow logic associated with the electronic survey identifier 308. Alternatively, in response to detecting a user interaction with the response option 406b, the electronic survey system 104 provides the electronic survey question text associated with the question identifier 310c.

Accordingly, as shown in FIG. 4, the survey flow logic associated with the electronic survey identifier 308 dictates that the electronic survey 400 includes three survey flow logic paths. For example, a first survey flow logic path includes the text 310a' associated with the question identifier 310a, followed by the questions associated with the text 310b' associated with question identifier 310b and the text 310d' associate with the question identifier 310d. Within this first survey flow logic path, the electronic survey system 104 provides the text 310b' associated with the question identifier 310b in response to a detected selection of the response option 406a (e.g., "Yes"). Similarly, the electronic survey system 104 provides the text 310d' associated with the question identifier 310d in response to a detected selection of the response option 406c (e.g., "18-25").

Furthermore, a second survey flow logic path includes the text 310a' associated with the question identifier 310a, followed by the text 310b' associated with the question identifier 310b and the text 310e' associated with the question identifier 310e. Within this second survey flow logic path, the electronic survey system 104 provides the text 310b' associated with the question identifier 310b in response to a detected selection of the response option 406a (e.g., "Yes"). Similarly, the electronic survey system 104 provides the text 310e' associated with the question identifier 310e in response to a detected selection of the response option 406d (e.g., "36+").

Additionally, as shown in FIG. 4, a third survey flow logic path includes the text 310a' associated with the question identifier 310a, followed by the text 310c' associated with the question identifiers 310c and the text 310f' associated with the question identifier 310f. Within this third survey flow logic path, the electronic survey system 104 provides the text 310c' associated with the question identifier 310c in response to a detected selection of the response option 406b (e.g., "No"). Similarly, the electronic survey system 104 provides the text 310f' associated with the question identifier 310f in response to a detected selection of the response option 406e (e.g., "Overpriced").

Moreover, additional shorter survey flow logic paths can include the text 310a' associated with the question identifier 310a followed by the text 310b' associated with the question identifier 310b, or the text 310a' associated with the question identifier 310a followed by the text 310c' associated with the question identifier 310c. In those survey flow logic paths, the electronic survey system 104 ends the electronic survey 400 when the user selects one of the response options 406f, 406g, or 406h. Otherwise, in one or more embodiments, the electronic survey system 104 ends the electronic survey 400 in response to the user selecting one of the response options 406i, 406j, 406k, 406l, 406m, 406n, or 406o. In at least one embodiment, upon ending the electronic survey 400, represented in FIG. 4, the electronic survey system 104 stores the user responses as indicated by the selected response options in order to provide data analysis and statistics to the electronic survey administrator.

As discussed above, in one or more embodiments, the electronic survey system 104 includes the survey representation system 102. The survey representation system 102 enables multiple authors to collaborate on the same electronic survey by dynamically mapping the components of the electronic survey to an interactive survey representation document. The survey representation system 102 further makes the interactive survey representation document available via one or more collaboration systems (e.g., the collaboration system 108) where multiple author computing devices 114a-114c can access and modify the survey representation document. In response to receiving one or more indications of a modification related to the survey representation document, the survey representation system 102 generates an updated electronic survey based on the edited survey representation document.

In one or more embodiments, the electronic survey system 104 generates a survey representation document in response to receiving a signal from the administrator computing device 106 (e.g., as shown in FIG. 1). For example, the electronic survey system 104 can generate a survey representation document in response to receiving a request to share or export an electronic survey (e.g., the electronic survey 400) from the administrator computing device 106. Alternatively, the electronic survey system 104 can generate the survey representation document in response to receiving a request to edit the electronic survey from one or more of the author computing devices 114a-114c. In that embodiment, the electronic survey system 104 may only generate the survey representation document in response to determining that the request to edit comes from a pre-authorized author computing device.

Figure 5:
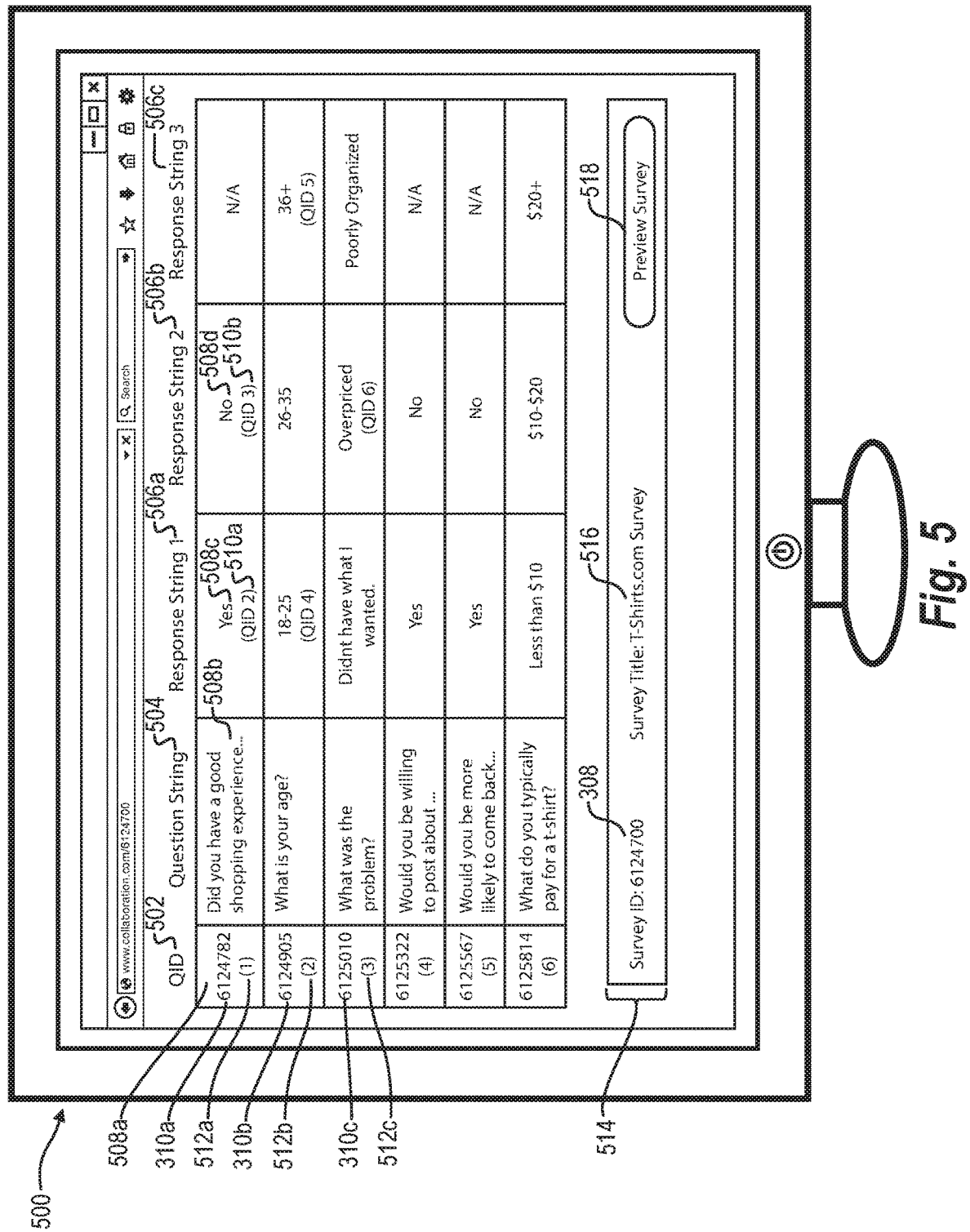
FIG. 5 illustrates a survey representation document in accordance with one or more embodiments.

In one or more embodiments, as mentioned above, the electronic survey system 104 generates a survey representation document to include each of the each of the components that make up an electronic survey that the electronic survey system 104 stores across multiple repositories, as described above. The electronic survey system 104 can generate the survey representation document in one of many different formats. FIG. 5 illustrates one example embodiment of a survey representation document 500 in a table or spreadsheet format generated by the electronic survey system 104 and presented via the collaboration system 108.

As shown in FIG. 5, the electronic survey system 104 can generate the survey representation document 500 to include a question ID column 502, a question string column 504, and one or more response string columns 506a, 506b, and 506c. Additionally, in at least one embodiment as shown in FIG. 5, the electronic survey system 104 generates a footer 514 including the electronic survey identifier 308, a survey title 516, and a preview survey button 518, discussed below. In one or more embodiments, the survey representation system 102 maps the information associated with the electronic survey identifier 308 from one or more repositories in the electronic survey system 104 to one or more table cells in the survey representation document 500.

For example, as illustrated in FIG. 5, the survey representation system 102 accesses the question ID repository 302 (as shown in FIG. 3) to identify all question identifiers (e.g., the question identifiers 310a-310f) associated with the electronic survey identifier 308. In at least one embodiment, the electronic survey system 104 then proceeds to map the information associated with each question identifier to document segments (e.g., table cells) in the survey representation document 500. For instance, as shown in FIG. 5, the survey representation system 102 maps the question identifier 310a to the table cell 508a under the question string column 502.

As illustrated in FIG. 5, the survey representation system 102 can add dedicated question identifiers to the electronic survey question represented across the table cells 502, 504, and 506a-506c. For example, in at least one embodiment, the question identifiers associated with an electronic survey can be several digits long, and may not be in direct sequential order. As such, an author may have a hard time following the survey flow logic indicated in the survey representation document 500. Accordingly, the survey representation system 102 can add a question ID mapping 512a to the table cell 508a. In one or more embodiments, the question ID mappings make the survey representation document 500 more user-friendly. Additionally, as will be discussed in greater detail below, the question ID mappings also make the survey flow logic easier for an author to follow in the survey representation document 500.

Additionally, the survey representation system 102 accesses the question contents repository 304 (as shown in FIG. 3) to map the contents associated with the question identifier 310 to the table cells 508b, 508c, and 508d. For example, the survey representation system 102 analyzes the contents of the entry in the question contents repository 304 associated with the question identifier 310a to identify a question string, and one or more response strings. For instance, the survey representation system 102 can utilize natural language processing, machine learning models, or other textual analysis techniques.

Accordingly, the survey representation system 102 maps the question string (e.g., "Did you have a good shopping experience today on tshirts.com?") to the table cell 508b in the question string column 504. Similarly, the survey representation system 102 maps the first response string (e.g., "Yes") to the table cell 508c under the response string column 506a, and maps the second response string (e.g., "No") to the table cell 508d under the response string column 506b. In one or more embodiments, the survey representation system 102 repeats this process for each question identifier (e.g., the question identifiers 310b-310f) associated with the survey ID 308 in the question ID repository 302.

Upon filling in the document segments of the survey representation document 500, the survey representation system 102 has not yet included survey flow logic information in the survey representation document 500. As discussed above, the survey flow logic (e.g., as laid out in the entry in the survey flow logic repository 306 associated with the electronic survey identifier 308) dictates one or more flow paths through the questions that make up an electronic survey, depending on detected response selections and other considerations. In one or more embodiments, the survey representation system 102 includes survey flow logic in the survey representation document 500 with one or more flow logic indicators.

For example, as shown in FIG. 5, the survey representation system 102 includes the flow logic indicator 510a in the table cell 508c to indicate the flow path resulting from the selection of the first response (e.g., "Yes") to the question associated with the question identifier 310a. For instance, in one or more embodiments, the survey representation system 102 includes the flow logic indicator 510a to indicate that in response to a selection of the first response (e.g., "Yes") laid out in the table cell 508c, the next question in the flow path is "QID2." In at least one embodiment, the flow logic indicator 510a utilizes the question ID mapping 512b to indicate the next question in the survey flow logic in response to a selection of the response associated with the table cell 508c is the question associated with the question identifier 310b.

Similarly, the survey representation system 102 includes the flow logic indicator 510b in the table cell 508d to indicate the flow path resulting from the selection of the second response (e.g., "No) to the question associated with the question identifier 310a. For instance, in one or more embodiments, the survey representation system 102 includes the flow logic indicator 510b to indicate that in response to a selection of the second response (e.g., "No"), the next question in the flow path is "QID3." As described above, the flow logic indicator 510b utilizes the question ID mapping 512c to indicate the next question in the survey flow logic in response to a selection of the response associated with the table cell 508d is the question associated with the question identifier 310c.

As described above, the collaboration system 108 provides the survey representation document 500 for collaboration to one or more authors. In one or more embodiments, the collaboration system 108 provides updates to the survey representation system 102 associated with the survey representation document 500 in response to author interactions with the survey representation document 500. For example, the collaboration system 108 can provide an update related to the survey representation document in response to an author opening or accessing the survey representation document 500. Additionally, the collaboration system 108 can provide an update in response to a received indication of a modification to one or more table cells in the survey representation document 500. Furthermore, the collaboration system 108 can provide an update in response to an author closing the survey representation document 500.

In one or more embodiments, the collaboration system 108 can provide updates related to the survey representation document 400 regularly (e.g., every ten seconds), regardless of whether any author interactions with the survey representation document 500 are detected. Alternatively, the collaboration system 108 can provide updates only in response to detecting an author interaction with the survey representation document 500. In at least one embodiment, the collaboration system 108 includes information in each update including, but not limited to, a user identifier associated with the author (e.g., a collaboration system identifier associated with the author, an electronic survey system identifier associated with the author), a type of interaction detected in connection with the survey representation document 500 (e.g., a click, a text deletion, a text change, a table cell addition), and a timestamp associated with the detected interaction.

In response to receiving any of the updates related to the survey representation document 500, the survey representation system 102 can determine whether to synchronize the survey representation document 500 with the electronic survey maintained by the electronic survey system 104. For example, in one embodiment, the survey representation system 102 can determine to synchronize the survey representation document 500 with the electronic survey in response to each update received from the collaboration system 108. Alternatively, the survey representation system 102 can determine to synchronize the survey representation document 500 in response to receiving a threshold number of updates within a threshold period of time. Alternatively, the survey representation system 102 can determine to synchronize the survey representation document 500 in response to not receiving any updates from the collaboration system 108 for a threshold amount of time. Alternatively, the survey representation system 102 can determine to synchronize the survey representation document 500 only in response to receiving an update specifying that an author has closed survey representation document 500.

In at least one embodiment, rather than determining to synchronize the survey representation document 500 in response to one or more updates from the collaboration system 108, the survey representation system 102 can determine to synchronize the survey representation document 500 in response to a detected selection of the preview survey button 518. For example, in one or more embodiments, a selection of the preview survey button 518 initiates a system API call to the survey representation system 102 that instructs the survey representation system 102 to request a copy of the survey representation document 500 for synchronization.

Additionally, in response to the detected selection of the preview survey button 518, the survey representation system 102 provides a preview display of an electronic survey based on the copy of the survey representation document 500. For example, prior to synchronizing the copy of the survey representation document 500 with the corresponding electronic survey, the survey representation system 102 can generate a preview display that includes a temporary electronic survey that includes the contents and flow logic laid out in the modified survey representation document 500. The preview display enables the author to view a temporary version of the electronic survey as the electronic survey system 104 would present it to an eventual survey-taker. Thus, the author can see in real-time how a modification affects the visual display of the electronic survey.

In one or more embodiments and in response to determining to synchronize the survey representation document 500 with the corresponding electronic survey in the electronic survey system 104, the survey representation system 102 synchronizes the survey representation document 500 by identifying components in the electronic survey that correspond to segments of the survey representation document 500. For example, the survey representation system 102 can request, via the collaboration system API 110, a copy of the survey representation document 500. In response to receiving the copy of the survey representation document 500, the survey representation system 102 analyzes the survey representation document 500 to identify an electronic survey identifier (e.g., the electronic survey identifier 308). With the electronic survey identifier, the survey representation system 102 can identify the various components of the corresponding electronic survey across the question ID repository 302, the question contents repository 304, and the survey flow logic repository 306, as described above with reference to FIG. 3.

Next, the survey representation system 102 can identify differences between the identified components of the electronic survey within the electronic survey system 104 and one or more document segments of the survey representation document 500. For example, the survey representation system 102 can identify document segments of the survey representation document 500 that correspond to components of the electronic survey. To illustrate, the survey representation system 102 can determine the question string "Did you have a good shopping experience . . . " in the table cell 508b corresponds to first entry in the question contents repository 304.

If the document segment of the survey representation document 500 containing the question string "Did you have a good shopping experience . . . " (e.g., the table cell 508b)

has been modified by one or more authors, and no longer is a direct match to the first entry in the question contents repository 304, the survey representation system 102 can still determine that the first entry in the question contents repository 304 corresponds to that segment. For example, the survey representation system 102 can utilize machine learning to calculate a confidence score representing the likelihood that the question string in the table cell 508*b* is an edited version of the question string in the first entry in the question contents repository 304. If the confidence score is above a threshold amount, the survey representation system 102 can determine that the contents of the table cell 508*b* corresponds to the first entry in the question contents repository 304, and can apply the edits from the table cell 508*b* to the first entry in the question contents repository 304. In one or more embodiments, the survey representation system 102 continues this process with each segment of the survey representation document 500 until each segment of the survey representation document 500 is mapped back into the electronic survey maintained by the electronic survey system 104.

In addition to mapping the question and response contents of the survey representation document 500 back into the corresponding components of the electronic survey, the survey representation system 102 also maps the survey flow logic back into the electronic survey. For example, one or more authors may have modified the survey flow logic outlined by the one or more flow logic indicators in the survey representation document 500. Accordingly, the survey representation document 500 maps the survey flow logic outlined by the one or more flow logic indicators back into the entry in the survey flow logic repository 306 associated with the electronic survey identifier 308.

In at least one embodiment, the survey representation system 102 performs error checking during the process of mapping the survey representation document 500 back into the electronic survey maintained by the electronic survey system 104. For example, the survey representation system 102 can utilize one or more of machine learning models, grammars, rule sets, templates, or algorithms to determine that a change in survey flow logic dictated by one or more flow logic indicators creates an error such as a question loop (e.g., a particular response to a question causes a previously answered question to be displayed), or a lost question branch (e.g., a particular response to a question causes the survey flow to jump to a different question branch, keeping one or more questions from being displayed). In response to determining that a particular change in survey flow logic creates an error, the survey representation system 102 can roll-back the change (e.g., revert the survey flow logic repository 306 to a previous version). Additionally, the survey representation system 102 can update the survey representation document 500 to include an error notification associated with the flow logic indicator that caused the error (e.g., "Error detected," "This causes a question loop").

In one or more embodiments, the collaboration system 108 enables one or more of the author computing devices 114*a*-114*c* to add annotations to the survey representation document 500. For example, an author computing device may add an annotation to the survey representation document 500 in order to ask a question related to a segment of the survey representation document 500, to comment on a word choice within the survey representation document 500, or to suggest a different flow logic selection. An author may want to utilize an annotation rather than editing a segment of the survey representation document 500 when the author is not sure that the edit is appropriate.

Accordingly, in at least one embodiment, the survey representation system 102 can receive annotations from the collaboration system 108 in addition to receiving copies of the survey representation document 500. In one or more embodiments, the survey representation system 102 creates a new annotation repository and stores the received annotations in annotation repository in an entry associated with the electronic survey identifier 308 and/or with the associated question ID. The electronic survey system 104 can present the annotations to the administrator computing device 106 along with the components of the corresponding electronic survey.

In at least one embodiment, the collaboration system 108 does not provide conflict resolution between multiple instances of the survey representation document 500 modified by more than one author computing device 114*c*. In that case, the survey representation system 102 may receive multiple copies of the survey representation document 500 including conflicting edits to one or more segments of the survey representation document 500. In one or more embodiments, the survey representation system 102 can synchronize the multiple copies of the survey representation document 500 into the corresponding components of the electronic survey by utilizing operational transformation technology to resolve conflicts between the multiple copies of the survey representation document 500. For example, utilizing operational transformation technology, the survey representation system 102 can utilize timestamp information to determine the order in which various modifications occurred by the author computing devices 114*a*-114*c*. The survey representation system 102 can then adjust the parameters of one modification according to the effects of a previous modification in order to maintain document consistency.

In at least one embodiment, the survey representation system 102 resolves modification conflicts relative to the survey representation document 500 based on author hierarchy. For example, when the survey representation system 102 creates of the survey representation document 500, the administrator computing device 106 can specifically enumerate the author computing devices 114*a*-114*c* that are permitted to edit the survey representation document 500. Furthermore, the administrator computing device 106 can also assign a hierarchy to the enumerated author computing devices. For instance, the administrator computing device 106 may assign a higher permission level to the author computing device 114*a* and lower permission levels to the author computing devices 114*b* and 114*c*. In that embodiment, if a conflict exists between modifications entered by the author computing device 114*a* and modifications entered by the author computing device 114*c*, the survey representation system 102 will synchronize the modifications entered by the author computing device 114*a*.

In one or more embodiments, the survey representation system 102 enables one or more author computing devices to add and remove entire questions to and from an electronic survey via the survey representation document 500. For example, in one embodiment, the author computing device 114*a* can add a row of table cells to the survey representation document 500 and enter question text and response text for one or more responses to table cells in the new row under the columns 502, 504, 506*a*, 506*b*, and 506*c*. The author computing device 114*a* can further add a new question ID mapping to the row, and can insert flow logic indicators into the responses, as described above.

In response to determining to synchronize the survey representation document 500, the survey representation system 102 can recognize the new question in response to determining that no question identifier is assigned to the new row in the survey representation document 500. In response to determining that the new table row represents a new question, the survey representation system 102 can assign a unique question identifier to the new row (e.g., under the question ID column 502) and can map the contents of the table cells in the row into the one or more repositories associated with the electronic survey identifier 308, in the manner described above.

Similarly, the survey representation system 102 can recognize the deletion of a survey question in response to determining that a row from the survey representation document 500 has been deleted. For example, in one embodiment, the survey representation document 500 is associated with metadata that includes a number of table rows represented in the survey representation document 500. The survey representation system 102 determines a table row has been deleted from the survey representation document 500 by comparing the current number of rows against the metadata.

In response to determining that a row has been deleted from the survey representation document 500, the survey representation system 102 can compare the question identifiers listed in the survey representation document 500 against the question identifiers listed in the question ID repository 302 under the electronic survey identifier 308 in order to identify the question identifier that has been deleted. In one embodiment, the survey representation system 102 can remove that question identifier from the question ID repository 302, effectively removing the associated question from the electronic survey. Alternatively, the survey representation system 102 may only delete a question from an electronic survey with approval from the administrator computing device 106. In that case, the survey representation system 102 can notify the administrator computing device 106 of the deletion from the survey representation document 500, and request approval for deletion of the corresponding question from the electronic survey maintained by the electronic survey system 104.

In at least one embodiment, the deletion of a question from the electronic survey may affect the survey flow logic associated with the electronic survey. Accordingly, the survey representation system 102 may only delete a question from the electronic survey in response to determining that the deletion does not cause one or more errors in the associated survey flow logic. For example, the survey representation system 102 may only delete the question in response to determining that the deletion does not cause a question loop, or a broken branch of flow logic.

As illustrated in FIG. 5, the survey representation system 102 can format the survey representation document 500 as a table or spreadsheet. In additional or alternative embodiments, the survey representation system 102 can format the survey representation document 500 in other ways. For example, in one embodiment, the survey representation system 102 can format the survey representation document 500 as a word processing document. In that embodiment, the survey representation system 102 can utilize paragraph indenting, bullet points, and/or outline numerals to organize question strings, associated response strings, and survey flow logic. The survey representation system 102 can further indicate survey flow logic with colors, font sizes, parenthetical insertions, pseudocode, a numerical code, a display structure (e.g., bullet points, indentations) and/or graphical indicators (e.g., arrow connectors). In other embodiments, the survey representation system 102 can format the survey representation document 500 as pseudo code or as a scripted document (e.g., in LaTex, or similar).

Figure 6:
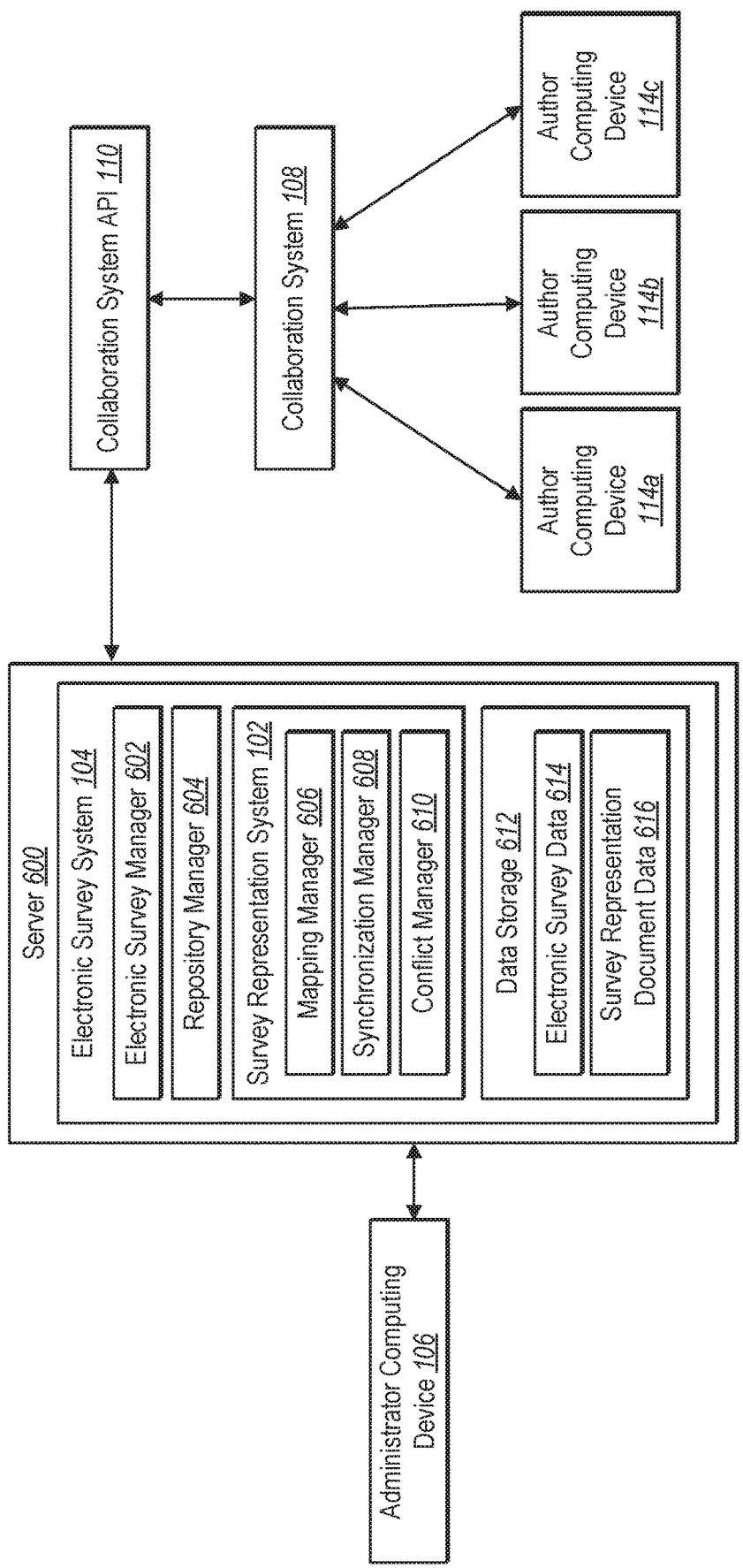
FIG. 6 illustrates a schematic diagram of the survey representation system in accordance with one or more embodiments.

FIG. 6 illustrates another example embodiment of the survey representation system 102. Specifically, the survey representation system 102 is hosted by the electronic survey system 104 operating on the server 600. As shown in FIG. 6, the electronic survey system 104 also includes an electronic survey manager 602, a repository manager 604, and a data storage 612 including electronic survey data 614 and survey representation document data 616. Furthermore, the survey representation system 102 includes a mapping manager 606, a synchronization manager 608, and a conflict manager 610.

Although the survey representation system 102 and electronic survey system 104 are depicted as having various components, the survey representation system 102 and electronic survey system 104 can have any number of additional or alternative components. Alternatively, one or more components of the survey representation system 102 and electronic survey system 104 can be combined into fewer components or divided into more components. Additionally, although FIG. 6 illustrates the survey representation system 102 and electronic survey system 104 on a single server, the survey representation system 102 and electronic survey system 104 can be on any number of server devices or on a single device (e.g., the administrator computing device 106). In one or more embodiments, the collaboration system API 110 also operates on the server 600 as part of the survey representation system 102. Furthermore, in at least one embodiment, the electronic survey system 104, the collaboration system API 110, and the collaboration system 108 both operate on the server 600.

In one or more embodiments, each of the components and subcomponents of the survey representation system 102 or electronic survey system 104 can be in communication with one another using any suitable communication technologies. It will be recognized that although the subcomponents of the survey representation system 102 and electronic survey system 104 are shown to be separate in FIG. 6, any of the subcomponents can be combined into fewer components, such as into a single component, or divided into more components as can serve a particular implementation. Furthermore, although the components of FIG. 6 are described in connection with the electronic survey system 104, at least some of the components for performing operations in conjunction with the survey representation system 102 or electronic survey system 104 described herein can be implemented on other devices and/or with other systems.

The components of the survey representation system 102 and electronic survey system 104 can include software, hardware, or both. For example, the components of the survey representation system 102 and electronic survey system 104 can include one or more instructions stored on computer-readable storage mediums and executable by processors of one or more computing devices. When executed by the one or more processors, the computer-executable instructions of the survey representation system 102 and electronic survey system 104 can cause the computing device(s) to perform the survey creation and administration processes described herein. Alternatively, the components of the survey representation system 102 and electronic survey system 104 can comprise hardware, such as a special purpose processing device to perform a certain function or group of functions. Additionally, the components of the survey representation system 102 and electronic survey system 104 can comprise a combination of computer-executable instructions and hardware.

Furthermore, the components of the survey representation system 102 and electronic survey system 104 performing the functions described herein with respect to electronic survey administration and collaboration can, for example, be implemented as part of a stand-alone application, as a module of an application, as part of a suite of applications, as a plug-in for applications including content creation applications, as a library function or functions that can be called by other applications, and/or as a cloud-computing model. Thus, various components of the survey representation system 102 and electronic survey system 104 can be implemented as part of a stand-alone application on a personal computing device or a mobile device. For example, the components of the survey representation system 102 and electronic survey system 104 can be implemented in any application that allows for the administration and collaboration of an electronic survey, as can serve a particular embodiment.

As shown in FIG. 6, and as mentioned above, the electronic survey system 104 includes the electronic survey manager 602. In one or more embodiments, the electronic survey manager 602 provides interfaces and information to the administrator computing device 106 that enables the configuration and creation of an electronic survey. For example, utilizing one or more interfaces provided by the electronic survey manager 602, the administrator computing device 106 can submit an electronic survey title, question contents, and survey flow logic. In at least one embodiment, the electronic survey manager 602 assigns unique identifiers (e.g., an electronic survey identifier, a question identifier) to the received electronic survey information in order to prepare the information for storage in one or more electronic survey repositories.

As further shown in FIG. 6, the electronic survey system 104 includes the repository manager 604. In one or more embodiments, the repository manager 604 receives the electronic survey information from the electronic survey manager 602, described above, and stores that information in one or more electronic survey repositories based on the identifiers assigned to the information. For example, as described above with reference to FIG. 3, the repository manager 604 organizes electronic survey information into linked repositories including the question ID repository 302, the question contents repository 304, and the survey flow logic repository 306. In addition to storing information in one or more repositories, the repository manager 604 also retrieves information out of one or more repositories. For example, in response to a data query from the survey representation system 102 or from the electronic survey manager 602, the repository manager 604 can retrieve information from a single repository, or from multiple linked repositories.

Additionally, as shown in FIG. 6 and as mentioned above, the electronic survey system 104 includes the survey representation system 102. In one or more embodiments, the survey representation system 102 generates a survey representation document including all the disparate components of an electronic survey and makes the survey representation document available to one or more author computing devices 114*a*-114*c* for collaboration via the collaboration system API 110. Furthermore, the survey representation system 102 also synchronizes an modified copy of the survey representation document with one or more components of the corresponding electronic survey maintained by the electronic survey system 104. Accordingly, the survey representation system 102 provides a flexible and efficient collaboration tool for electronic survey authors.

As shown in FIG. 6, the survey representation system 102 includes the mapping manager 606. In one or more embodiments, the mapping manager 606 generates a survey representation document by mapping components of an electronic survey into a single document. For example, as described above, the mapping manager 606 can map components of an electronic survey into a spreadsheet table, into a word processing document, or into a presentation slide. In one or more embodiments, as described above, the mapping manager 606 formats a generated survey representation document to indicate survey flow logic by adding parenthetical text, colors, pseudocode, numerical codes, indentations, bullet points, font sizes, and so forth.

Furthermore, the mapping manager 606 maps document segments of a modified copy of a survey representation document received from the collaboration system 108 back into an electronic survey maintained by the electronic survey system 104. For example, as described above, the mapping manager 606 can analyze text and formatting in a survey representation document to identify an electronic survey identifier, question identifiers, question strings, response strings, and survey flow logic indicators. Utilizing the electronic survey identifier and question identifiers, the mapping manager 606 can identify corresponding electronic survey components in the one or more repositories maintained by the electronic survey system 104.

The mapping manager 606 further utilizes natural language processing, and machine learning to identify modifications in one or more segments of the survey representation document. In response to identifying an modified segment of the survey representation document, the mapping manager 606 can perform error checking to determine whether the modified segment includes a spelling or grammatical error. The mapping manager 606 can also determine whether a modification effecting survey flow logic causes an logical error in the electronic survey. In one or more embodiments, the mapping manager 606 can utilize machine learning models, algorithms, grammars, databases, or any other applicable technique to perform error checking.

If the mapping manager 606 determines that a modified segment includes no errors, the mapping manager 606 can map the modified segment back into the corresponding component of the electronic survey. If the mapping manager 606 determines that an modified segment includes at least one error, the mapping manager 606 can roll the survey representation document back to an earlier version that does not include the modified segment. Alternatively, the mapping manager 606 can end the mapping process, and update the modified segment of the survey representation document with a notification indicating that the modified segment includes an error. Additionally or alternatively, the mapping manager 606 can generate and provide a notification to the electronic survey administrator that an author-based edit to the survey representation document has caused an error in the electronic survey.

Further shown in FIG. 6, the survey representation system 102 also includes the synchronization manager 608. In one or more embodiments, the synchronization manager 608 receives updates from the collaboration system 108 via the collaboration system API 110. For example, as laid out above, the collaboration system 108 can provide updates related to the survey representation document in response to: receiving an open command, receiving a save command, or receiving an indication of one of various types of modifications, deletions, or additions.

In at least one embodiment, the synchronization manager 608 includes one or more heuristics that dictate when one or more received updates trigger a synchronization of the survey representation document and the electronic survey.

For example, the synchronization manager 608 can include a heuristic that dictates a synchronization is triggered every time a save command is detected. Additionally or alternatively, the synchronization manager 608 can include heuristics that dictate a synchronization is triggered when a threshold number of modifications are detected in a particular period of time (e.g., five edits in under five minutes), when a threshold number of modifications are not detected in a particular period of time (e.g., the author computing devices 114a-114c have been idle for sixty seconds), or when a selection of a preview button is selected.

As further shown in FIG. 6, the survey representation system 102 includes the conflict manager 610. In the event that the collaboration system 108 does not include conflict resolution services, the conflict manager 610 resolves conflicting modifications that exist among multiple copies of the same survey representation document. For example, if more than one author computing device 114a-114c is accessing the survey representation document at the same time, it is possible that more than one author computing device enacts a modification on the same segment of the survey representation document. In one or more embodiments, the conflict manager 610 determines which modification to the segment of the survey representation document to map back into the electronic survey maintained by the electronic survey system 104. The conflict manager 610 determines which modification to map based on one or more of a timestamp associated with each modification (e.g., an earlier timestamp wins over a later timestamp), author hierarchy, administrator preferences, or administrator approval.

Also as shown in FIG. 6, and as mentioned above, the electronic survey system 104 also includes the data storage 612 including electronic survey data 614 and survey representation document data 616. In one or more embodiments, the electronic survey data 614 is representative of electronic survey information, such as described herein with reference to the question ID repository 302, the question contents repository 304, and the survey flow logic repository 306 in FIG. 3. In one or more embodiments, the survey representation document data 616 is representative of survey representation document information, such as described herein with reference to survey representation documents, collaboration system updates, author permissions, administrator preferences, synchronization heuristics, machine learning models, and so forth.

Figure 7:
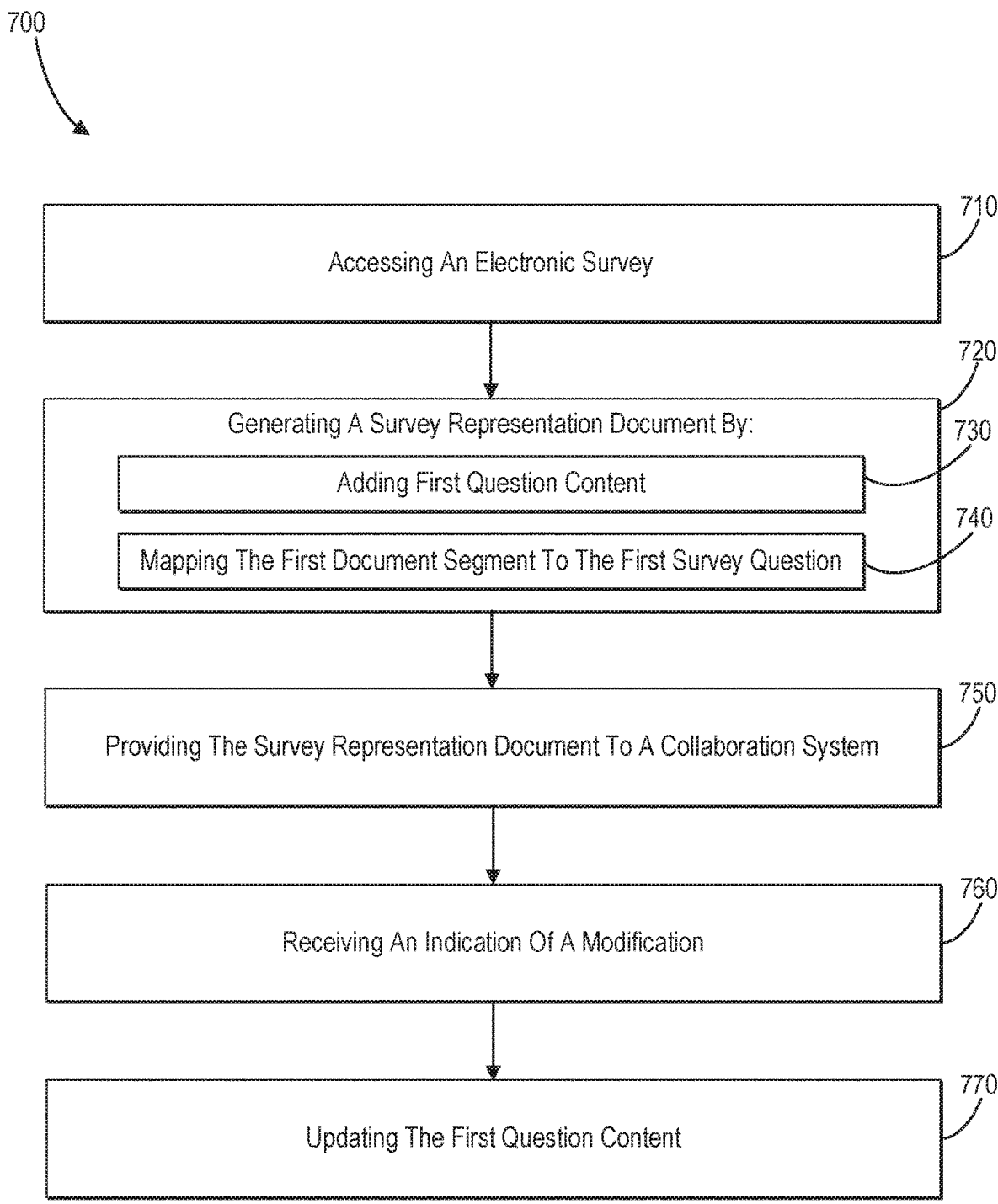
FIG. 7 illustrates a flowchart of a series of acts of updating an electronic survey based on modifications to a survey representation document.

Turning now to FIG. 7, this figure illustrates a flowchart of a series of acts 700 of updating an electronic survey based on modifications to a survey representation document. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable-medium can comprise instructions, that when executed by one or more processor, cause a computing device to perform the acts of FIG. 7. In still further embodiments, a system can perform the acts of FIG. 7.

As shown in FIG. 7, the series of acts 700 includes an act 710 of accessing an electronic survey. For example, the act 710 can involve accessing within an electronic survey system, an electronic survey comprising a plurality of survey questions, wherein each survey question of the plurality of survey questions is associated with a question identifier and comprises question content. For example, accessing the electronic survey can include: receiving an indication of an electronic survey identifier; and accessing a plurality of repositories, based on the electronic survey identifier to identify the one or more question identifiers, the question contents, and the survey flow logic.

As further shown in FIG. 7, the series of acts 700 includes an act 720 of generating a survey representation document. For example, the act 720 can involve the act 730 of adding first question content, and the act 740 of mapping the first document segment to a first survey question. In particular, the act 720 can involve generating a survey representation document for the electronic survey by: adding first question content corresponding to a first survey question of the plurality of survey questions to a first document segment of the survey representation document; and mapping the first document segment of survey representation document to the first survey question of the electronic survey within the electronic survey system.

For example, in one or more embodiments, mapping the first document segment of the survey representation document to the first survey question of the electronic survey within the electronic survey system includes using a first question identifier associated with the first survey question to link the first document segment to the first survey question. Additionally, the series of acts 700 can further include associating the representation document with an electronic survey identifier that corresponds to the electronic survey within the electronic survey system. In at least one embodiment, generating the survey representation document for the electronic survey further includes: identifying a survey flow logic that defines a presentation order logic for the plurality of survey questions; and adding flow logic indicators to the survey representation document that indicates the survey flow logic. For instance, the flow logic indicator can include one or more of a textual string, a color, pseudocode, a numerical code, or a display structure. In one or more embodiments, wherein formatting at least one of the one or more document segments to indicate the survey flow logic associated with the question identifier includes adding a flow logic indicator to a table cell associated with a response string that indicates a next question identifier associated with the selection of a response corresponding to that table cell.

Additionally, as shown in FIG. 7, the series of acts 700 includes an act 750 of providing the survey representation document to a collaboration system. For example, the act 750 can involve providing the survey representation document to a collaboration system through which one or more survey collaborators can access the survey representation document and edit the question content within the survey representation document. For instance, in at least one embodiment, providing the survey representation document to the collaboration system includes providing the survey representation document to the collaboration system through an API.

Furthermore, the series of acts 700 includes an act 760 of receiving an indication of a modification. For example, the act 760 can involve receiving an indication of a modification to the first question content within the first document segment. For instance, receiving an indication of a modification to the first question content can include receiving an indication of deleting text, changing colors, altering table cells, adding digital images, updating font choices and sizes, and adding annotations.

Additionally, the series of acts 700 includes an act 770 of updating the first question content. For example, the act 770 can involve updating, within the electronic survey system, the first question content corresponding to the first survey question based on the modification. In one or more embodiments, the series of acts 700 includes acts of: detecting a selection of a preview survey button associated with the survey representation document; in response to the detected selection of the preview survey button, receiving an indication of an additional modification to the first question content within the first document segment in the survey representation document; and updating the first question content based on the additional modification. In at least one embodiment, the series of acts 700 also includes an act of providing, in response to the detected selection of the preview survey button, a preview display of the electronic survey comprising the updated first question content.

Figure 8:
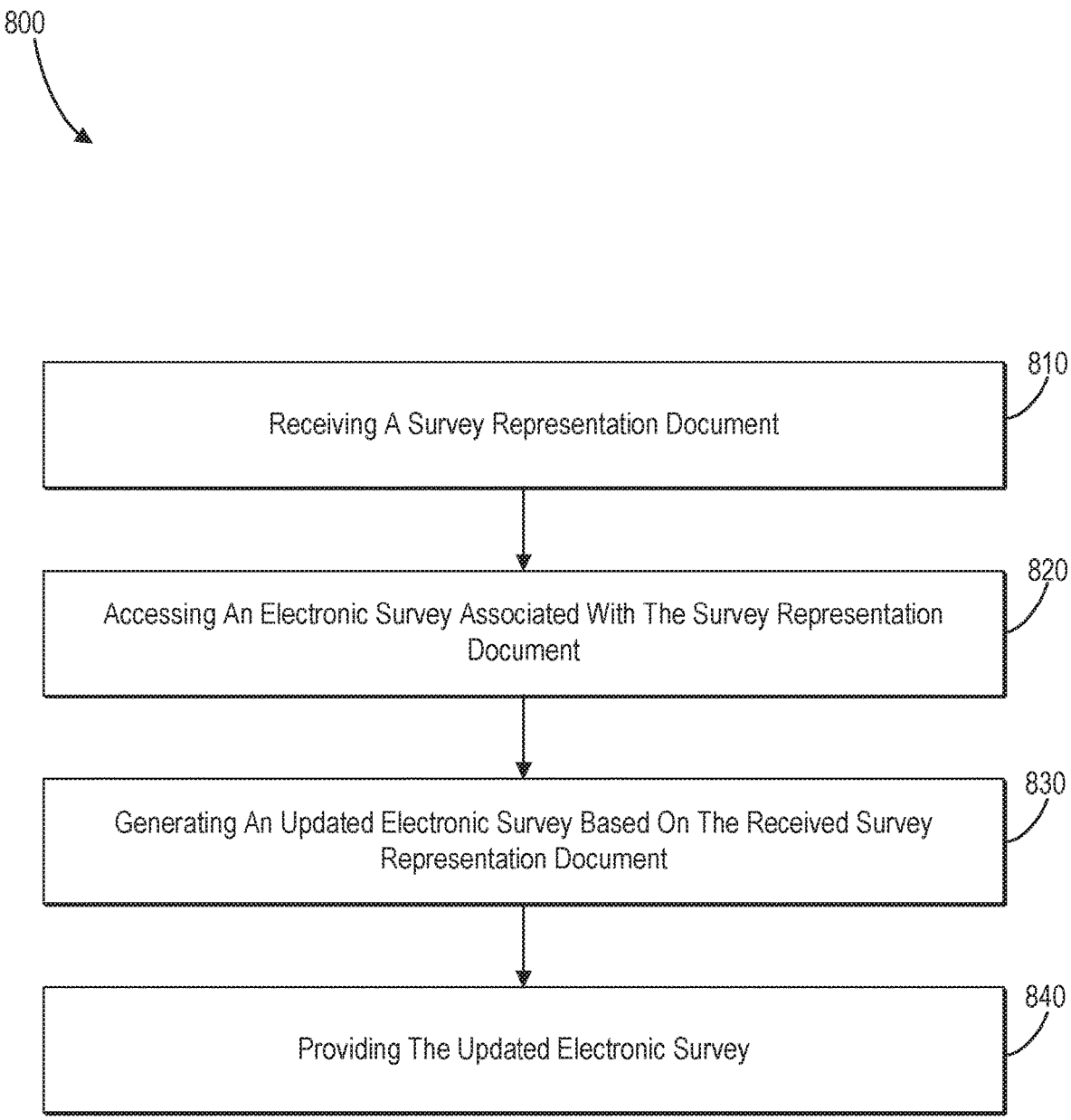
FIG. 8 illustrates a flowchart of a series of acts of mapping a survey representation document back into an electronic survey maintained by an electronic survey system in accordance with one or more embodiments.

Turning now to FIG. 8, this figure illustrates a flowchart of a series of acts 800 of mapping a survey representation document back into an electronic survey maintained by the electronic survey system 104. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable-medium can comprise instructions, that when executed by one or more processor, cause a computing device to perform the acts of FIG. 8. In still further embodiments, a system can perform the acts of FIG. 8.

As shown in FIG. 8, the series of acts 800 includes an act 810 of receiving a survey representation document. For example, the act 810 can involve receiving, from a collaboration system, an survey representation document, wherein the survey representation document comprises an electronic survey identifier, one or more question identifiers, question strings associated with each of the one or more question identifiers, and one or more response strings associated with each of the one or more question identifiers.

In one or more embodiments, receiving the survey representation document is in response to: detecting one or more synchronization triggers; and determining, based on the detected one or more synchronization triggers, to generate an updated electronic survey. For instance, the one or more synchronization triggers can include one or more of a detected access of the survey representation document, a detected edit to the survey representation document, a detected annotation to the survey representation document, a detected closing of the survey representation document, or a detected selection of a preview button associated with the survey representation document. Additionally, in at least one embodiment, determining, based on the detected one or more synchronization triggers, to generate an updated electronic survey can include determining that the survey representation document has not been edited for a threshold amount of time, determining that the survey representation document has received a threshold number of edited, detecting that the survey representation document has been closed, determining that the preview button associated with the survey representation document has been selected.

As further shown in FIG. 8, the series of acts 800 includes an act 820 of accessing an electronic survey associated with the survey representation document. For example, the act 820 can involve accessing an electronic survey associated with the survey representation document based on the electronic survey identifier. For instance, in at least one embodiment, accessing the electronic survey associated with the survey representation document based on the electronic survey identifier can include accessing a plurality of repositories in the electronic survey system that are linked based on the electronic survey identifier.

Also shown in FIG. 8, the series of acts 800 includes an act 830 of generating an updated electronic survey based on the received survey representation document. For example, the act 830 can involve generating an updated electronic survey based on the survey representation document, wherein generating the updated electronic survey comprises, for each of the one or more question identifiers in the survey representation document: identifying the question identifier from at least one repository associated with the electronic survey; updating, within the at least one repository associated with the electronic survey, question contents associated with the question identifier to reflect one or more portions of the survey representation document; updating survey flow logic associated with the electronic survey based on an analysis of one or more portions of the survey representation document.

In at least one embodiment, the series of acts 800 includes an act of, in response to generating the updated electronic survey, determining that one or more errors exist in the updated electronic survey, wherein the one or more errors comprise a question loop, a missing question branch, or a grammatical error. For example, the series of acts 800 can also include, in response to determining that one or more errors exist in the updated electronic survey, correcting the updated electronic survey by rolling the updated electronic survey back to an earlier version, and updating one or more portions of the survey representation document to indicate the one or more errors.

Additionally, the series of acts 800 includes an act 840 of providing the updated electronic survey. For example, the act 840 can involve providing the updated electronic survey to one or more users via an electronic survey system. In one or more embodiments, providing the updated electronic survey to one or more users includes providing the components of the electronic survey combined into one or more electronic survey system graphical user interfaces.

Embodiments of the present disclosure can comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions can be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure can be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure can also be practiced in distributed system environments where local and remote computer systems, which are linked (either by hardwired data links, wireless data links, or by a combination of hardwired and wireless data links) through a network, both perform tasks. In a distributed system environment, program modules can be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
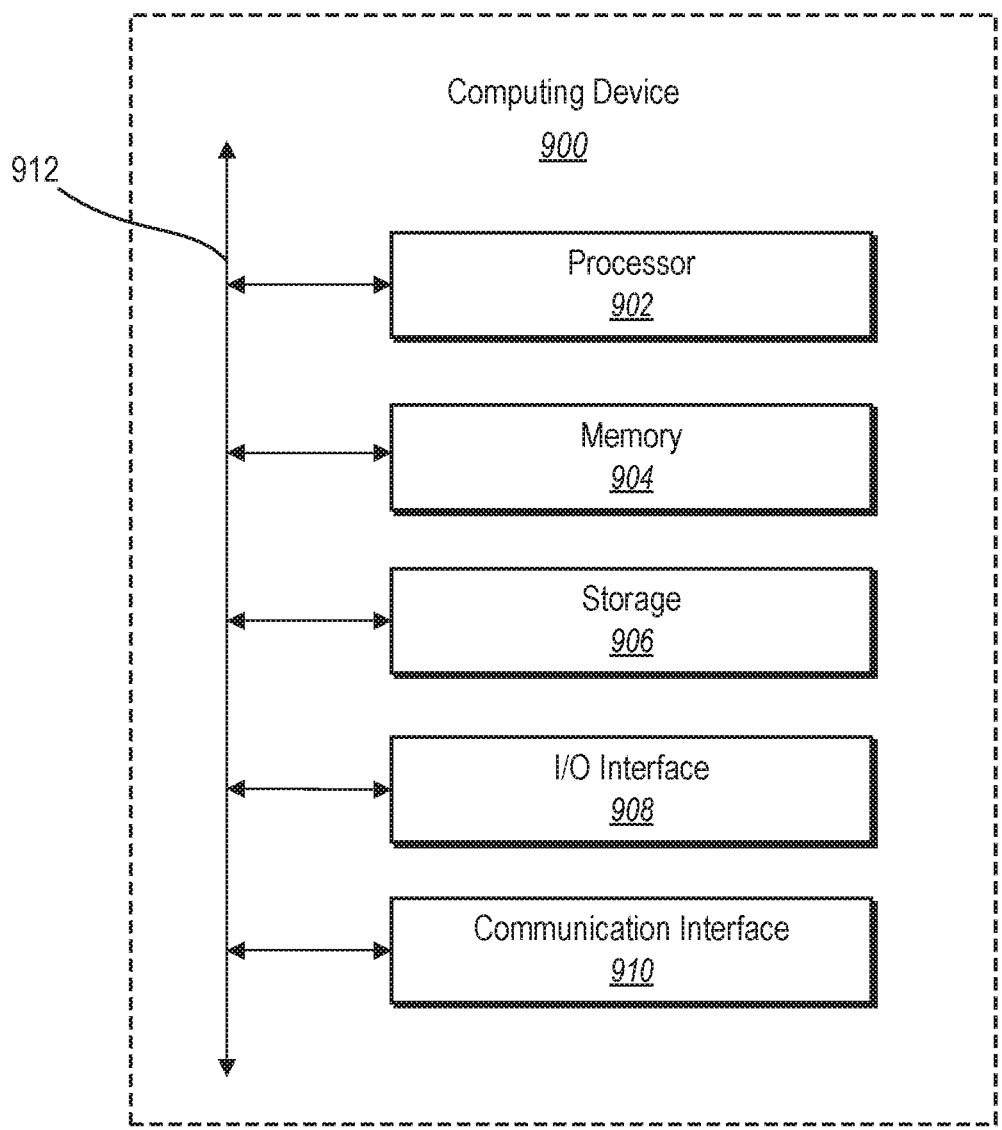
FIG. 9 illustrates a block diagram of a computing device in accordance with one or more embodiments.

FIG. 9 illustrates a block diagram of exemplary computing device 900 that can be configured to perform one or more of the processes described above. One will appreciate that one or more computing devices such as the computing device 900 can implement the various devices of the environment 100 of FIG. 1. As shown by FIG. 9, the computing device 900 can comprise a processor 902, a memory 904, a storage device 906, an I/O interface 908, and a communication interface 910, which can be communicatively coupled by way of a communication infrastructure 912. While an exemplary computing device 900 is shown in FIG. 9, the components illustrated in FIG. 9 are not intended to be limiting. Additional or alternative components can be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 can retrieve (or fetch) the instructions from an internal register, an internal cache, the memory 904, or the storage device 906 and decode and execute them. In one or more embodiments, the processor 902 can include one or more internal caches for data, instructions, or addresses. As an example and not by way of limitation, the processor 902 can include one or more instruction caches, one or more data caches, and one or more translation lookaside buffers (TLBs). Instructions in the instruction caches can be copies of instructions in the memory 904 or the storage 906.

The memory 904 can be used for storing data, metadata, and programs for execution by the processor(s). The memory 904 can include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 can be internal or distributed memory.

The storage device 906 includes storage for storing data or instructions. As an example and not by way of limitation, storage device 906 can comprise a non-transitory storage medium described above. The storage device 906 can include a hard disk drive (HDD), a floppy disk drive, flash memory, an optical disc, a magneto-optical disc, magnetic tape, or a Universal Serial Bus (USB) drive or a combination of two or more of these. The storage device 906 can include removable or non-removable (or fixed) media, where appropriate. The storage device 906 can be internal or external to the computing device 900. In one or more embodiments, the storage device 906 is non-volatile, solid-state memory. In other embodiments, the storage device 906 includes read-only memory (ROM). Where appropriate, this ROM can be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from computing device 900. The I/O interface 908 can include a mouse, a keypad or a keyboard, a touch screen, a camera, an optical scanner, network interface, modem, other known I/O devices or a combination of such I/O interfaces. The I/O interface 908 can include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data can be representative of one or more graphical user interfaces and/or any other graphical content as can serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 can include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 910 can facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, the communication interface 910 can facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 can facilitate communications various communication protocols. Examples of communication protocols that can be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 can include hardware, software, or both that couples components of the computing device 900 to each other. As an example and not by way of limitation, the communication infrastructure 912 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
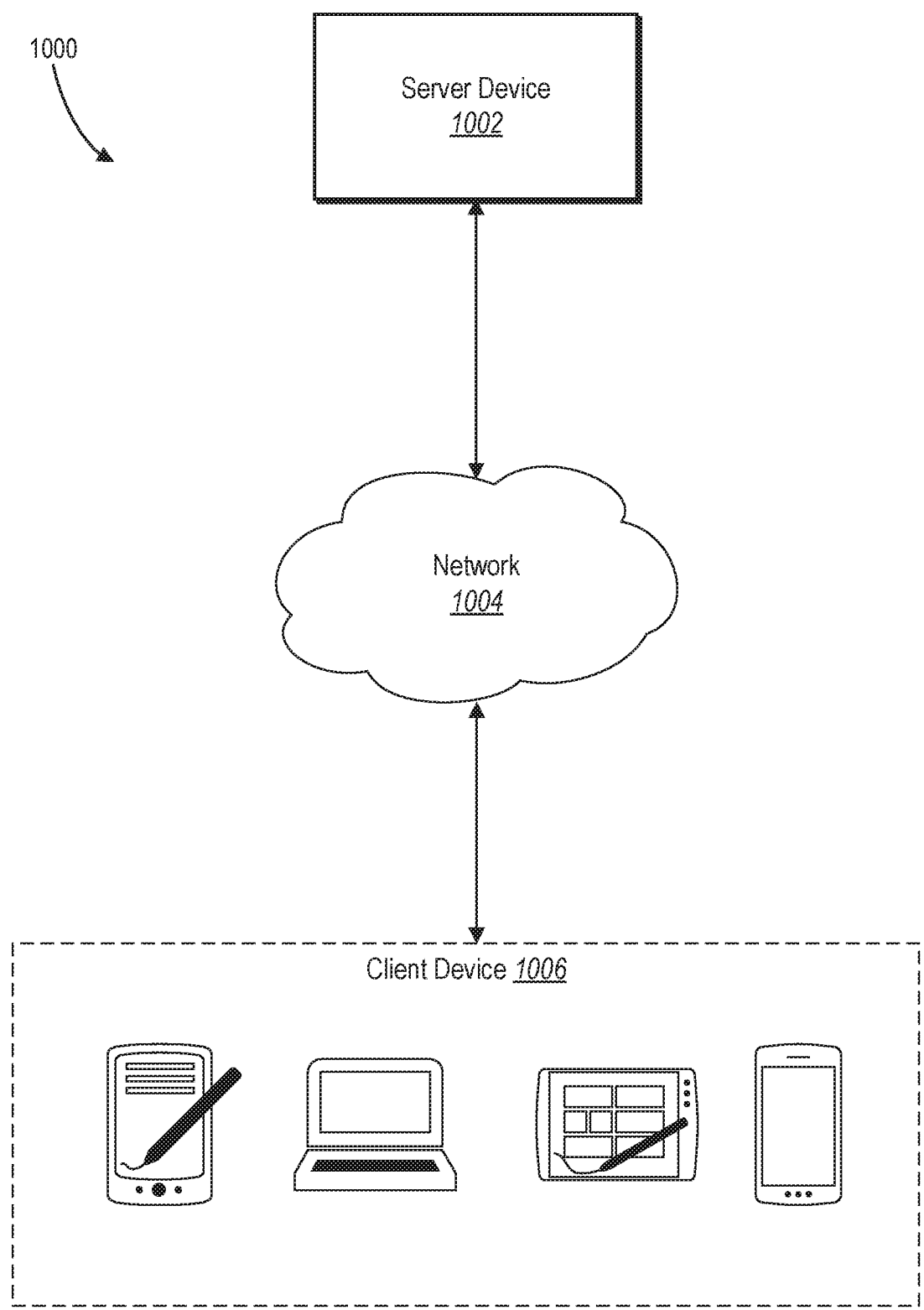
FIG. 10 illustrates a networking environment of an electronic survey system in accordance with one or more embodiments.

FIG. 10 illustrates an example network environment 1000 for an electronic survey system 104. Network environment 1000 includes a client device 1006, and a server device 1002 connected to each other by a network 1004. Although FIG. 10 illustrates a particular arrangement of client device 1006, server device 1002, and network 1004, this disclosure contemplates any suitable arrangement of client device 1006, server device 1002, and network 1004. As an example and not by way of limitation, two or more of client device 1006, and server device 1002 can be connected to each other directly, bypassing network 1004. As another example, two or more of client device 1006 and server device 1002 can be physically or logically co-located with each other in whole, or in part. Moreover, although FIG. 10 illustrates a particular number of client devices 1006, server devices 1002, and networks 1004, this disclosure contemplates any suitable number of client devices 1006, server devices 1002, and networks 1004. As an example and not by way of limitation, network environment 1000 can include multiple client devices 1006, server devices 1002, and networks 1004.

This disclosure contemplates any suitable network 1004. As an example and not by way of limitation, one or more portions of network 1004 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1004 can include one or more networks 1004.

Links can connect client device 1006, and server device 1002 to communication network 1004 or to each other. This disclosure contemplates any suitable links. In particular embodiments, one or more links include one or more wire-line (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links can differ in one or more respects from one or more second links.

In particular embodiments, client device 1006 can be an electronic device including hardware, software, or embedded logic components or a combination of two or more such components and capable of carrying out the appropriate functionalities implemented or supported by client device 1006. As an example and not by way of limitation, a client device 1006 can include any of the computing devices discussed above in relation to FIG. 10. A client device 1006 can enable a network user at client device 1006 to access network 1004. A client device 1006 can enable its user to communicate with other users at other client devices or systems.

In particular embodiments, client device 1006 can include a web browser, such as MICROSOFT INTERNET EXPLORER, GOOGLE CHROME, or MOZILLA FIREFOX, and can have one or more add-ons, plug-ins, or other extensions, such as TOOLBAR or YAHOO TOOLBAR. A user at client device 1006 can enter a Uniform Resource Locator (URL) or other address directing the web browser to a particular server (such as server, or a server associated with a third-party system), and the web browser can generate a Hyper Text Transfer Protocol (HTTP) request and communicate the HTTP request to server. The server can accept the HTTP request and communicate to client device 1006 one or more Hyper Text Markup Language (HTML) files responsive to the HTTP request. Client device 1006 can render a webpage based on the HTML files from the server for presentation to the user. This disclosure contemplates any suitable webpage files. As an example and not by way of limitation, webpages can render from HTML files, Extensible Hyper Text Markup Language (XHTML) files, or Extensible Markup Language (XML) files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

In particular embodiments, server device 1002 can include a variety of servers, sub-systems, programs, modules, logs, and data stores. In particular embodiments, server device 1002 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1002 can also include suitable components such as network interfaces, security mechanisms, load balancers, failover servers, management-and-network-operations consoles, other suitable components, or any suitable combination thereof.

In particular embodiments, server device 1002 can include one or more user-profile stores for storing user profiles. A user profile can include, for example, biographic information, demographic information, behavioral information, social information, or other types of descriptive information, such as work experience, educational history, hobbies or preferences, interests, affinities, or location. Interest information can include interests related to one or more categories. Categories can be general or specific The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method comprising:
accessing, within an electronic survey system, an electronic survey comprising a plurality of survey questions, wherein each survey question of the plurality of survey questions is associated with a question identifier and comprises question content;
in response to accessing the electronic survey, generating a survey representation document based on the electronic survey by:
adding first question content corresponding to a first survey question of the plurality of survey questions to a first document segment of the survey representation document; and
mapping the first document segment of the survey representation document to the first survey question of the electronic survey within the electronic survey system;
providing the survey representation document to a collaboration system through which one or more survey collaborators can access the survey representation document and edit the question content within the survey representation document;
receiving, from the collaboration system, an indication of one or more user interactions in connection with the first question content within the first document segment in the survey representation document;
determining that the one or more user interactions with the survey representation document comprises a synchronization trigger associated with the survey representation document; and
updating, within the electronic survey system and based on the detected synchronization trigger, the first survey question in the electronic survey based on the one or more user interactions in connection with the first question content within the first document segment in the survey representation document.

2. The method as recited in claim 1, wherein mapping the first document segment of the survey representation document to the first survey question of the electronic survey within the electronic survey system comprises using a first question identifier associated with the first survey question to link the first document segment to the first survey question.

3. The method as recited in claim 1, further comprising associating the survey representation document with an electronic survey identifier that corresponds to the electronic survey within the electronic survey system.

4. The method as recited in claim 1, wherein generating the survey representation document based on the electronic survey further comprises:
identifying a survey flow logic that defines a presentation order for the plurality of survey questions; and
adding flow logic indicators to the survey representation document that indicates the survey flow logic.

5. The method as recited in claim 4, wherein the flow logic indicators comprise one or more of a textual string, a color, pseudocode, a numerical code, or a display structure.

6. The method as recited in claim 5, further comprising formatting one or more document segments associated with the plurality of survey questions to indicate the survey flow logic by adding, to a table cell associated with a response string, a flow logic indicator that indicates a next question identifier associated with the selection of a response corresponding to the response string associated with that table cell.

7. The method as recited in claim 6, further comprising:
detecting a selection of a preview survey button associated with the survey representation document;
in response to the detected selection of the preview survey button, receiving an indication of an additional modification to the first question content within the first document segment in the survey representation document; and
updating the first question content in the survey representation document based on the additional modification.

8. The method as recited in claim 7, further comprising, providing, in response to the detected selection of the preview survey button, a preview display of the electronic survey comprising the updated first question content.

9. A non-transitory computer-readable medium storing instructions thereon that, when executed by at least one processor, cause a system to:
access, within an electronic survey system, an electronic survey comprising a plurality of survey questions, wherein each survey question of the plurality of survey questions is associated with a question identifier and comprises question content;
in response to accessing the electronic survey, generate a survey representation document based on the electronic survey by:
adding first question content corresponding to a first survey question of the plurality of survey questions to a first document segment of the survey representation document; and
mapping the first document segment of the survey representation document to the first survey question of the electronic survey within the electronic survey system;
provide the survey representation document to a collaboration system through which one or more survey collaborators can access the survey representation document and edit the question content within the survey representation document;
receive, from the collaboration system, an indication of one or more user interactions in connection with the first question content within the first document segment in the survey representation document;
determine that the one or more user interactions with the survey representation document comprises a synchronization trigger associated with the survey representation document; and
update, within the electronic survey system and based on the detected synchronization trigger, the first survey question in the electronic survey based on the one or more user interactions in connection with the first question content within the first document segment in the survey representation document.

10. The non-transitory computer-readable medium as recited in claim 9, wherein mapping the first document segment of the survey representation document to the first survey question of the electronic survey within the electronic survey system comprises using a first question identifier associated with the first survey question to link the first document segment to the first survey question.

11. The non-transitory computer-readable medium as recited in claim 10, further storing instructions thereon that, when executed by at least one processor, cause the system to associate the survey representation document with an electronic survey identifier that corresponds to the electronic survey within the electronic survey system.

12. The non-transitory computer-readable medium as recited in claim 11, wherein generating the survey representation document based on the electronic survey further comprises:
identifying a survey flow logic that defines a presentation order for the plurality of survey questions; and
adding flow logic indicators to the survey representation document that indicates the survey flow logic.

13. The non-transitory computer-readable medium as recited in claim 12, wherein the flow logic indicators comprise one or more of a textual string, a color, pseudocode, a numerical code, or a display structure.

14. The non-transitory computer-readable medium as recited in claim 13, further storing instructions thereon that, when executed by at least one processor, cause the system to format one or more document segments associated with the plurality of survey questions to indicate the survey flow logic by adding, to a table cell associated with a response string, a flow logic indicator that indicates a next question identifier associated with the selection of a response corresponding to the response string associated with that table cell.

15. The non-transitory computer-readable medium as recited in claim 14, further storing instructions thereon that, when executed by at least one processor, cause the system to:
detect a selection of a preview survey button associated with the survey representation document;
in response to the detected selection of the preview survey button, receive an indication of an additional modification to the first question content within the first document segment in the survey representation document; and
update the first question content in the survey representation document based on the additional modification.

16. The non-transitory computer-readable medium as recited in claim 15, further storing instructions thereon that, when executed by at least one processor, cause the system to provide, in response to the detected selection of the preview survey button, a preview display of the electronic survey comprising the updated first question content.

17. A system comprising:

at least one processor; and at least one non-transitory computer-readable storage medium storing instructions thereon that, when executed by the at least one processor, cause the system to:

access, within an electronic survey system, an electronic survey comprising a plurality of survey questions, wherein each survey question of the plurality of survey questions is associated with a question identifier and comprises question content;

in response to accessing the electronic survey, generate a survey representation document based on the electronic survey by:

adding first question content corresponding to a first survey question of the plurality of survey questions to a first document segment of the survey representation document; and mapping the first document segment of the survey representation document to the first survey question of the electronic survey within the electronic survey system;

provide the survey representation document to a collaboration system through which one or more survey collaborators can access the survey representation document and edit the question content within the survey representation document;

receive, from the collaboration system, an indication of one or more user interactions in connection with the first question content within the first document segment in the survey representation document;

determine that the one or more user interactions with the survey representation document comprises a synchronization trigger associated with the survey representation document; and update, within the electronic survey system and based on the detected synchronization trigger, first survey question in the electronic survey based on the one or more user interactions in connection with the first question content within the first document segment in the survey representation document.

18. The system as recited in claim 17, wherein mapping the first document segment of the survey representation document to the first survey question of the electronic survey within the electronic survey system comprises using a first question identifier associated with the first survey question to link the first document segment to the first survey question.

19. The system as recited in claim 18, further storing instructions thereon that, when executed by the at least one processor, cause the system to associate the survey representation document with an electronic survey identifier that corresponds to the electronic survey within the electronic survey system.

20. The system as recited in claim 19, wherein generating the survey representation document based on the electronic survey further comprises:

identifying a survey flow logic that defines a presentation order logic for the plurality of survey questions; and adding flow logic indicators to the survey representation document that indicates the survey flow logic.

* * * * *